United States Patent
Dharmarajan et al.

(10) Patent No.: US 10,011,709 B2
(45) Date of Patent: Jul. 3, 2018

(54) COMPOSITIONS COMPRISING PROPYLENE-BASED ELASTOMERS AND POLYALPHAOLEFINS

(71) Applicant: ExxonMobil Chemical Patents Inc., Baytown, TX (US)

(72) Inventors: Narayanaswami Dharmarajan, Houston, TX (US); Christopher E. Hrbacek, Pensacola, FL (US); Paul E. Rollin, Jr., Porter, TX (US); Andy H. Tsou, Houston, TX (US); Madhavi Vadlamudi, Clinton, NJ (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 0 days.

(21) Appl. No.: 15/533,253

(22) PCT Filed: Dec. 11, 2015

(86) PCT No.: PCT/US2015/065247
§ 371 (c)(1),
(2) Date: Jun. 5, 2017

(87) PCT Pub. No.: WO2016/137559
PCT Pub. Date: Sep. 1, 2016

(65) Prior Publication Data
US 2017/0362421 A1 Dec. 21, 2017

Related U.S. Application Data

(60) Provisional application No. 62/121,242, filed on Feb. 26, 2015.

(51) Int. Cl.
*C08L 23/16* (2006.01)
*B32B 5/02* (2006.01)
*B32B 27/32* (2006.01)

(52) U.S. Cl.
CPC ............. *C08L 23/16* (2013.01); *B32B 5/022* (2013.01); *B32B 27/32* (2013.01); *B32B 2307/51* (2013.01); *C08L 2205/02* (2013.01); *C08L 2205/03* (2013.01); *C08L 2205/242* (2013.01)

(58) Field of Classification Search
CPC .. C08L 23/16; C08L 2205/02; C08L 2205/03; C08L 2205/242; B32B 5/022; B32B 27/32; B32B 2307/51
See application file for complete search history.

(56) References Cited

U.S. PATENT DOCUMENTS

| | | | |
|---|---|---|---|
| 5,310,584 A | 5/1994 | Jacoby et al. | |
| 5,491,188 A * | 2/1996 | Ikeda et al. | B01D 67/0027 264/154 |
| 6,235,823 B1 | 5/2001 | Ikeda et al. | |
| 7,122,584 B2 | 10/2006 | Moriya et al. | |
| 7,319,077 B2 | 1/2008 | Mehta et al. | |
| 7,335,696 B2 | 2/2008 | Yalvac et al. | |
| 7,629,416 B2 | 12/2009 | Li et al. | |
| 7,645,829 B2 | 1/2010 | Tse et al. | |
| 7,662,885 B2 | 2/2010 | Coffey et al. | |
| 7,910,637 B2 | 3/2011 | Kiss et al. | |
| 7,951,732 B2 | 5/2011 | Dharmarajan et al. | |
| 7,998,579 B2 | 8/2011 | Lin et al. | |
| 8,304,049 B2 | 11/2012 | Machl et al. | |
| 8,586,163 B2 | 11/2013 | Malm et al. | |
| 2004/0106723 A1 * | 6/2004 | Yang et al. | C08K 5/01 524/570 |
| 2009/0043049 A1 | 2/2009 | Chapman et al. | |
| 2011/0008623 A1 | 1/2011 | Dhodapkar et al. | |
| 2013/0053479 A1 | 2/2013 | Bond et al. | |
| 2013/0281596 A1 | 10/2013 | Mohan et al. | |
| 2016/0177042 A1 | 6/2016 | Williams | |
| 2016/0326357 A1 | 11/2016 | Dharmarajan et al. | |

FOREIGN PATENT DOCUMENTS

| | | |
|---|---|---|
| WO | 98/39385 | 9/1998 |
| WO | 2004/014998 | 2/2004 |
| WO | 2006/118807 | 11/2006 |
| WO | 2015/012948 | 1/2015 |
| WO | 2015/047604 | 4/2015 |
| WO | 2015/130340 | 9/2015 |

OTHER PUBLICATIONS

Chapman et al., "Modification of PO-TPEs with a fully paraffinic liquid modifier," Robber World, vol. 237, No. 1, Oct. 2007, pp. 35-44.
Dharmarajan, et al., "Tailoring the Performance of Specialty Polyolefin Elastomer Based Elastic Nonwovens," INTC 2006, Houston, TX, Sep. 25-28, 2006, pp. 1-23.
Harrington, et al., "Processability and Fabric Attributes of Specialty Polyolefin Elastomers," INTC 2005, St. Louis, MO, Sep. 19-22, 2005, pp. 1-11.
Gallez et al., "Elastic Nonwoven Fabrics from Specialty Polyolefin Elastomers," INDEX 2005, Geneva, Apr. 13-14, 2005, pp. 1-28.

* cited by examiner

*Primary Examiner* — Nathan M Nutter

(57) ABSTRACT

Provided are compositions comprising a propylene-based elastomer and a polyalphaolefin. The compositions may be particularly useful in elastic film compositions, and especially useful as elastic film layers in nonwoven laminates.

19 Claims, 4 Drawing Sheets

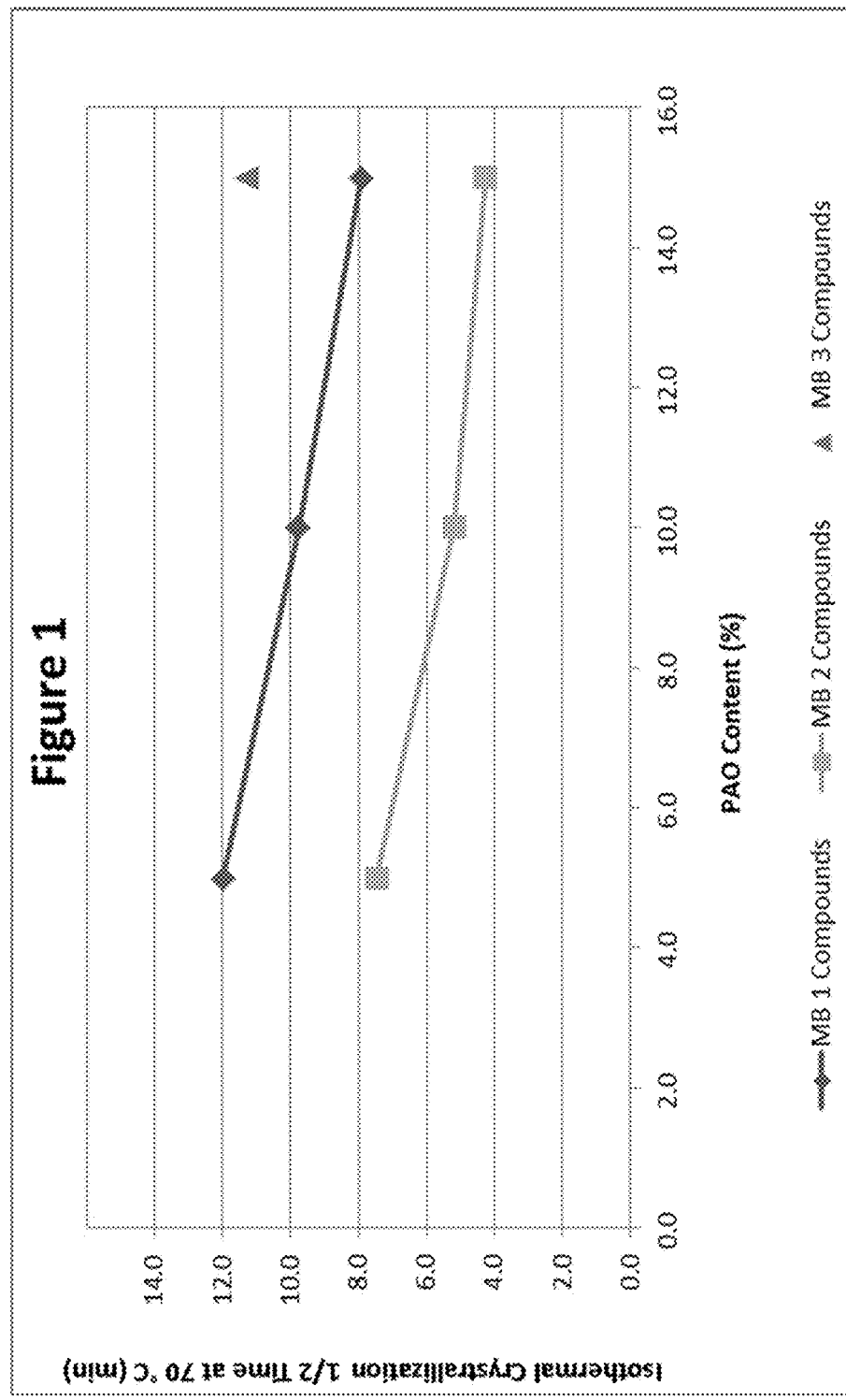

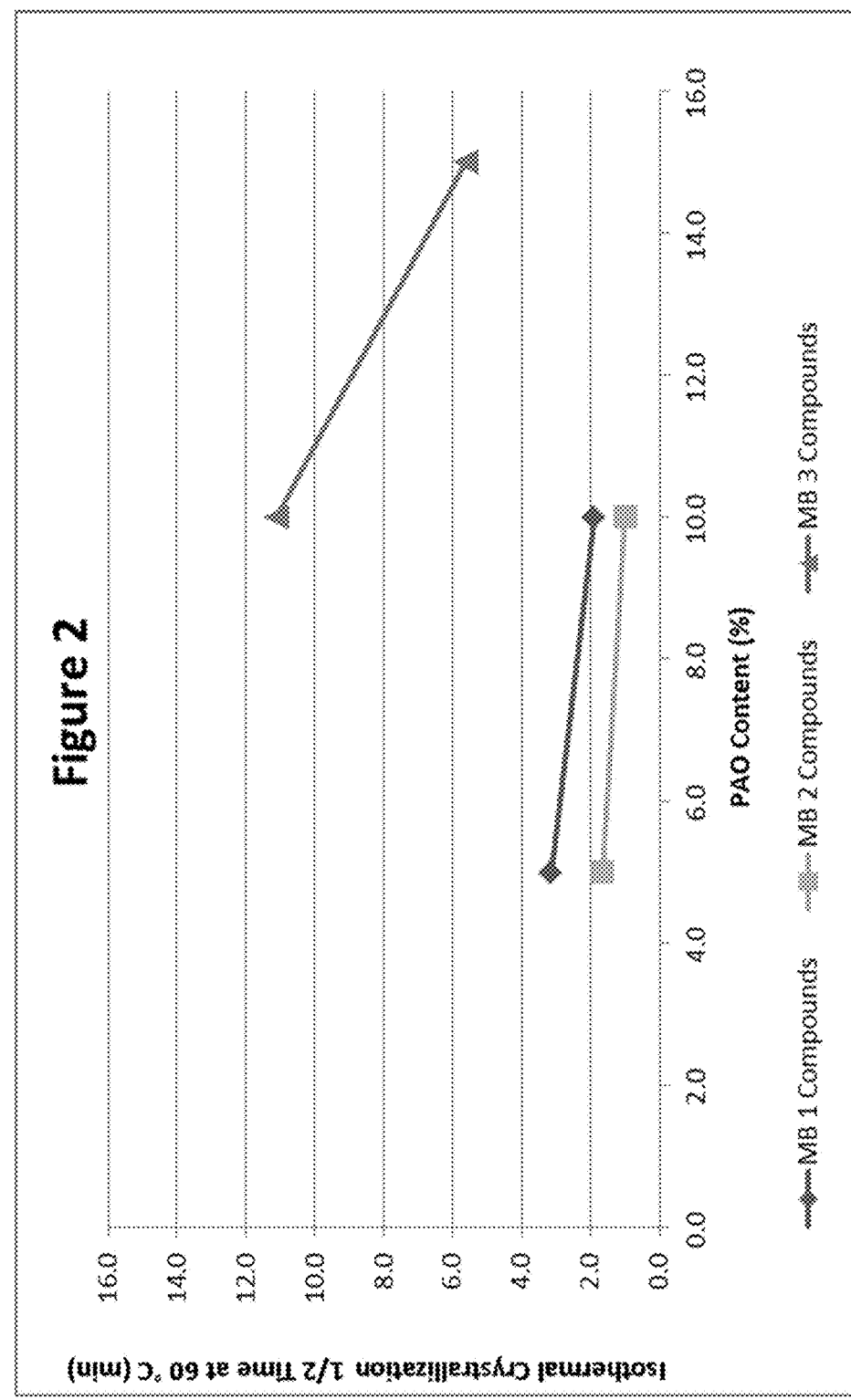

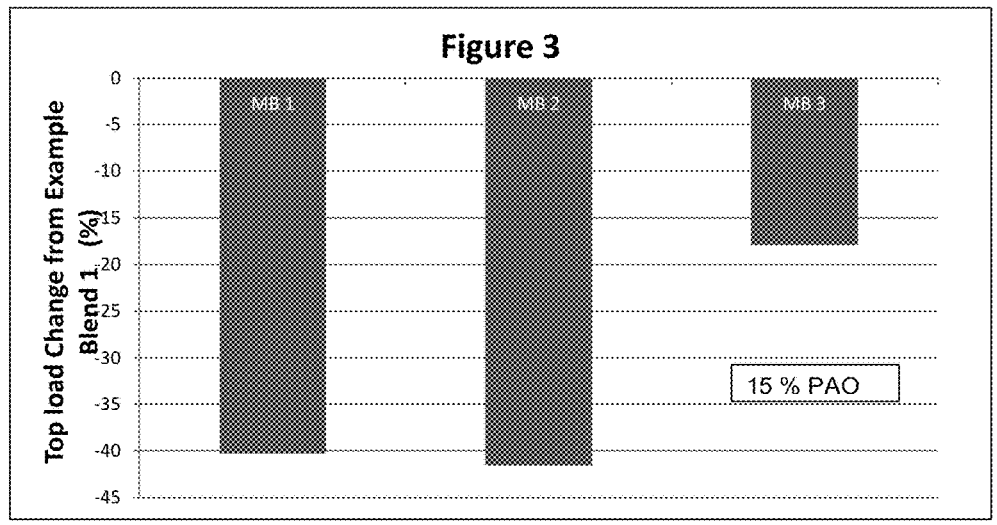
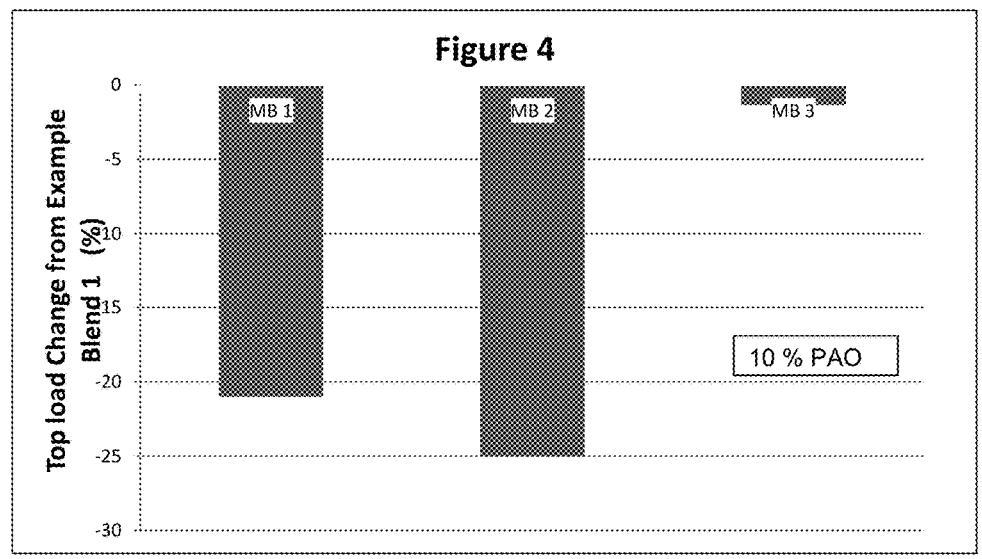

US 10,011,709 B2

COMPOSITIONS COMPRISING PROPYLENE-BASED ELASTOMERS AND POLYALPHAOLEFINS

CROSS REFERENCE TO RELATED APPLICATIONS

This application is a National Phase Application claiming priority to PCT Application Serial No. PCT/US2015/065247 filed Dec. 11, 2015, and U.S. Provisional Application No. 62/121,242, filed Feb. 26, 2015, and is related to (i) PCT Application No. PCT/US2014/051866, filed on Aug. 20, 2014, which claims priority to U.S. Provisional Application No. 61/884,484, filed on Sep. 30, 2013; and (ii) PCT Application No. PCT/US2014/051870, filed on Aug. 20, 2014, which claims priority to U.S. Provisional Application No. 61/945,612, filed on Feb. 27, 2014, the disclosures of which are incorporated herein by reference.

FIELD OF THE INVENTION

This invention relates to compositions comprising propylene-based elastomers and polyalphaolefins and to articles made therefrom.

BACKGROUND OF THE INVENTION

Polypropylene resins are well known in the art for their usefulness in a variety of applications, including the manufacture of films, fibers, nonwoven fabrics, and injection molded articles. While, polypropylene resins can be used to produce fabrics that have an aesthetically pleasing feel, in general polypropylene resins, such as polypropylene homopolymers, have little to no elasticity. This precludes the use of polypropylene resins in many nonwovens applications where elasticity is desired, such as stretch components for elastic closures in personal hygiene products.

However, elastic laminates have been developed where a layer of elastic resin is sandwiched between outer layers of relatively inelastic polypropylene resins. The elastic laminates may then comprise outer facing layers that provide aesthetic feel and inner core layers that provide the laminate with elastic properties. Such elastic laminate compositions have been made that include an inner film layer of a propylene-based polymer, such as a propylene-based elastomer, sandwiched between outer polypropylene fabric layers. However, such film layers often do not possess the desired soft-stretch, where the laminate when extended shows a load that increases initially but remains relatively unchanged with additional extension, that is required for some applications such as elastic closures. Additionally, such film layers often do not crystallize quickly enough during the laminate production process, thus leading to changes in the laminate properties over time.

Background references include U.S. Pat. Nos. 5,310,584; 6,235,823; 7,122,584; 7,335,696; 7,629,416; 7,645,829; 7,662,885; 7,951,732; 7,998,579; 8,304,049; and 8,586,163; U.S. Publication Nos. 2009/0043049; 2011/008623; 2013/0053479; and 2013/0281596; EP Publication No. 0964890; PCT Publication Nos. WO 2004/014998, WO 2006/118807, and WO 2009/035579, and PCT Application No. PCT/US2014/039169.

While the above references provide a variety of different polymers, fabrics, and films, none provide for an elastic laminate having the desired soft-stretch and the desired consistency of mechanical properties over time. Therefore, there is a need for elastic laminates having good soft-stretch and elasticity constructed from compatible inner layer films and outer facing layers. There is also a need for elastic laminates that possess a film layer that crystallizes during the laminate production window.

BRIEF DESCRIPTION OF THE FIGURES

FIG. 1 illustrates the change in crystallization half-time at 70° C. with varying PAO content of the formulations of Example 1.

FIG. 2 illustrates the change in crystallization half-time at 60° C. with varying PAO content of the formulations of Example 1.

FIG. 3 illustrates the change in load at 100% elongation relative to Example Blend 1 for formulations containing an 15 wt % PAO.

FIG. 4 illustrates the change in load at 100% elongation relative to Example Blend 1 for formulations containing an 10 wt % PAO.

SUMMARY OF THE INVENTION

Figure 5:
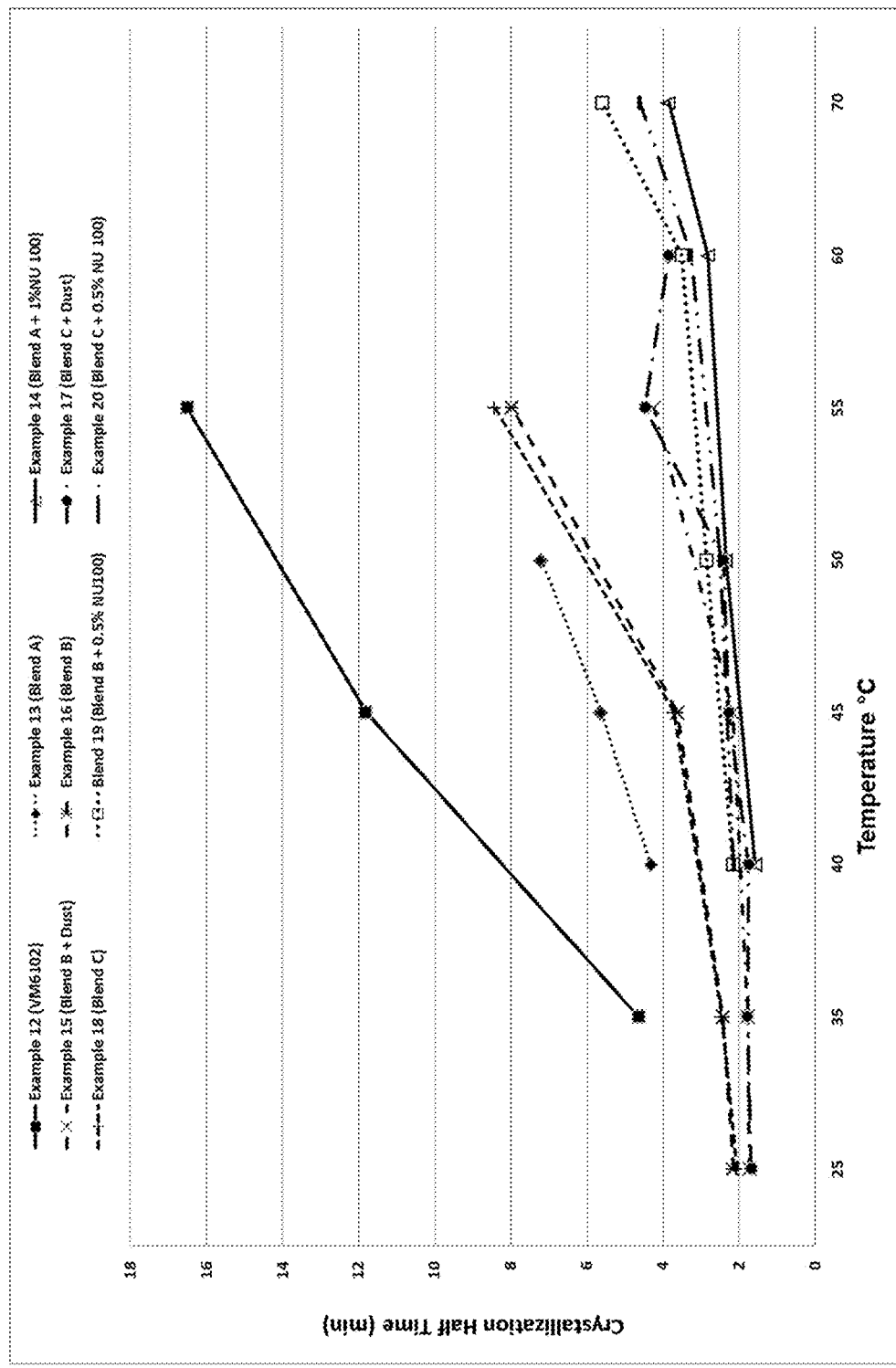
FIG. 5 illustrates the crystallization rate at various temperatures of the blends of Example 3.

Provided herein are compositions comprising propylene-based elastomers and polyalphaolefins. The compositions may be particularly useful in elastic film compositions and in elastic nonwoven laminate compositions.

In some embodiments, the composition further comprises β-nucleating agent. The β-nucleating agent may be selected from amide compounds of formula (1), (2), or (3), as described herein:

$$R^2\text{—NHCO—}R^1\text{—CONH—}R^3 \quad (1)$$

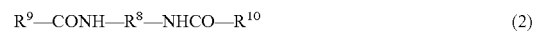

$$R^9\text{—CONH—}R^8\text{—NHCO—}R^{10} \quad (2)$$

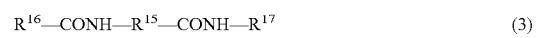

$$R^{16}\text{—CONH—}R^{15}\text{—CONH—}R^{17} \quad (3)$$

In some embodiments, the compositions are dusted with an ethylene-based polymer.

Preferred compositions exhibit an onset of crystallization at a temperature of at least 60° C. and/or have a crystallization half-life of less than 10 minutes at 70° C. temperature.

DETAILED DESCRIPTION OF THE INVENTION

Described herein are compositions comprising propylene-based elastomers and polyalphaolefins. The compositions may be useful in making films, fibers, and nonwoven laminates and composites. In particular, the compositions may be useful in making elastic films and nonwovens for hygiene laminate applications.

As used herein, the term "copolymer" is meant to include polymers having two or more monomers, optionally, with other monomers, and may refer to interpolymers, terpolymers, etc. The term "polymer" as used herein includes, but is not limited to, homopolymers, copolymers, terpolymers, etc., and alloys and blends thereof. The term "polymer" as used herein also includes impact, block, graft, random, and alternating copolymers. The term "polymer" shall further include all possible geometrical configurations unless otherwise specifically stated. Such configurations may include isotactic, syndiotactic and random symmetries. The term "elastomer" shall mean any polymer exhibiting some degree of elasticity, where elasticity is the ability of a material that has been deformed by a force (such as by stretching) to return at least partially to its original dimensions once the force has been removed.

The term "monomer" or "comonomer," as used herein, can refer to the monomer used to form the polymer, i.e., the unreacted chemical compound in the form prior to polymerization, and can also refer to the monomer after it has been incorporated into the polymer, also referred to herein as a "[monomer]-derived unit".

"Polypropylene," as used herein, includes homopolymers and copolymers of propylene or mixtures thereof. Products that include one or more propylene monomers polymerized with one or more additional monomers may be more commonly known as random copolymers (RCP) or impact copolymers (ICP). Impact copolymers may also be known in the art as heterophasic copolymers. "Propylene-based," as used herein, is meant to include any polymer comprising propylene, either alone or in combination with one or more comonomers, in which propylene is the major component (i.e., greater than 50 wt % propylene).

"Reactor grade," as used herein, means a polymer that has not been chemically or mechanically treated or blended after polymerization in an effort to alter the polymer's average molecular weight, molecular weight distribution, or viscosity. Particularly excluded from those polymers described as reactor grade are those that have been visbroken or otherwise treated or coated with peroxide or other prodegradants. For the purposes of this disclosure, however, reactor grade polymers include those polymers that are reactor blends.

"Reactor blend," as used herein, means a highly dispersed and mechanically inseparable blend of two or more polymers produced in situ as the result of sequential or parallel polymerization of one or more monomers with the formation of one polymer in the presence of another in series reactors, or by solution blending polymers made separately in parallel reactors. Reactor blends may be produced in a single reactor, a series of reactors, or parallel reactors and are reactor grade blends. Reactor blends may be produced by any polymerization method, including batch, semi-continuous, or continuous systems. Particularly excluded from "reactor blend" polymers are blends of two or more polymers in which the polymers are blended ex situ, such as by physically or mechanically blending in a mixer, extruder, or other similar device.

"Visbreaking," as used herein, is a process for reducing the molecular weight of a polymer by subjecting the polymer to chain scission. The visbreaking process also increases the MFR of a polymer and may narrow its molecular weight distribution. Several different types of chemical reactions can be employed for visbreaking propylene-based polymers. An example is thermal pyrolysis, which is accomplished by exposing a polymer to high temperatures, e.g., in an extruder at 270° C. or higher. Other approaches are exposure to powerful oxidizing agents and exposure to ionizing radiation. Another method of visbreaking is the addition of a prodegradant to the polymer. A prodegradant is a substance that promotes chain scission when mixed with a polymer, which is then heated under extrusion conditions. Examples of prodegradants that may be used include peroxides, such as alkyl hydroperoxides and dialkyl peroxides. These materials, at elevated temperatures, initiate a free radical chain reaction resulting in scission of polypropylene molecules. The terms "prodegradant" and "visbreaking agent" are used interchangeably herein. Polymers that have undergone chain scission via a visbreaking process are said herein to be "visbroken." Such visbroken polymer grades, particularly polypropylene grades, are often referred to in the industry as "controlled rheology" or "CR" grades.

"Catalyst system," as used herein, means the combination of one or more catalysts with one or more activators and, optionally, one or more support compositions. An "activator" is any compound(s) or component(s) capable of enhancing the ability of one or more catalysts to polymerize monomers to polymers.

As used herein, "nonwoven fabric" means a web structure of individual fibers or filaments that are interlaid, but not in an identifiable manner as in a knitted fabric.

Propylene-Based Elastomers

The compositions described herein comprise one or more propylene-based elastomers ("PBEs"). The PBE comprises propylene and from about 5 to about 30 wt % of one or more alpha-olefin derived units, preferably ethylene and/or $C_4$-$C_{12}$ α-olefins. For example, the alpha-olefin derived units, or comonomer, may be ethylene, butene, pentene, hexene, 4-methyl-1-pentene, octene, or decene. In preferred embodiments, the comonomer is ethylene. In some embodiments, the PBE consists essentially of propylene and ethylene, or consists only of propylene and ethylene. Some of the embodiments described below are discussed with reference to ethylene as the comonomer, but the embodiments are equally applicable to PBEs with other α-olefin comonomers. In this regard, the copolymers may simply be referred to as propylene-based elastomers with reference to ethylene as the α-olefin.

The PBE may include at least about 5 wt %, at least about 6 wt %, at least about 7 wt %, at least about 8 wt %, at least about 9 wt %, at least about 10 wt %, at least about 12 wt %, or at least about 15 wt %, α-olefin-derived units, where the percentage by weight is based upon the total weight of the propylene-derived and α-olefin-derived units. The PBE may include up to about 30 wt %, up to about 25 wt %, up to about 22 wt %, up to about 20 wt %, up to about 19 wt %, up to about 18 wt %, or up to about 17 wt %, α-olefin-derived units, where the percentage by weight is based upon the total weight of the propylene-derived and α-olefin-derived units. In some embodiments, the PBE may comprise from about 5 wt % to about 30 wt %, from about 6 wt % to about 25 wt %, from about 7 wt % to about 20 wt %, from about 10 wt % to about 19 wt %, from about 12 wt % to about 18 wt %, or from about 15 wt % to about 17 wt %, α-olefin-derived units, where the percentage by weight is based upon the total weight of the propylene-derived and α-olefin-derived units.

The PBE may include at least about 70 wt %, at least about 75 wt %, at least about 78 wt %, at least about 80 wt %, at least about 81 wt %, at least about 82 wt %, or at least about 83 wt %, propylene-derived units, where the percentage by weight is based upon the total weight of the propylene-derived and α-olefin derived units. The PBE may include up to about 95 wt %, up to about 94 wt %, up to about 93 wt %, up to about 92 wt %, up to about 91 wt %, up to about 90 wt %, up to about 88 wt %, or up to about 85 wt %, propylene-derived units, where the percentage by weight is based upon the total weight of the propylene-derived and α-olefin derived units.

The PBEs may be characterized by a melting point (Tm), which can be determined by differential scanning calorimetry (DSC). For purposes herein, the maximum of the highest temperature peak is considered to be the melting point of the polymer. A "peak" in this context is defined as a change in the general slope of the DSC curve (heat flow versus temperature) from positive to negative, forming a maximum without a shift in the baseline where the DSC curve is plotted so that an endothermic reaction would be shown with a positive peak. The Tm of the PBE (as determined by DSC) may be less than about 120° C., less than about 115° C., less than about 110° C., or less than about 105° C.

The PBE may be characterized by its heat of fusion (Hf), as determined by DSC. The PBE may have an Hf that is at least about 0.5 J/g, at least about 1.0 J/g, at least about 1.5 J/g, at least about 3.0 J/g, at least about 4.0 J/g, at least about 5.0 J/g, at least about 6.0 J/g, or at least about 7.0 J/g. The PBE may be characterized by an Hf of less than about 75 J/g, or less than about 70 J/g, or less than about 60 J/g, or less than about 50 J/g.

As used within this specification, DSC procedures for determining Tm and Hf are as follows. The polymer is pressed at a temperature of from about 200° C. to about 230° C. in a heated press, and the resulting polymer sheet is hung, under ambient conditions, in the air to cool. About 6 to 10 mg of the polymer sheet is removed with a punch die. This 6 to 10 mg sample is annealed at room temperature for about 80 to 100 hours. At the end of this period, the sample is placed in a DSC (Perkin Elmer Pyris One Thermal Analysis System) and cooled to about −30° C. to about −50° C. and held for 10 minutes at that temperature. The sample is then heated at 10° C./min to attain a final temperature of about 200° C. The sample is kept at 200° C. for 5 minutes. Then a second cool-heat cycle is performed, where the sample is again cooled to about −30° C. to about −50° C. and held for 10 minutes at that temperature, and then re-heated at 10° C./min to a final temperature of about 200° C. Events from both cycles are recorded. The thermal output is recorded as the area under the melting peak of the sample, which typically occurs between about 0° C. and about 200° C. It is measured in Joules and is a measure of the Hf of the polymer.

The PBE can have a triad tacticity of three propylene units (mmm tacticity), as measured by $^{13}$C NMR, of 75% or greater, 80% or greater, 85% or greater, 90% or greater, 92% or greater, 95% or greater, or 97% or greater. For example, the triad tacticity may range from about 75 to about 99%, from about 80 to about 99%, from about 85 to about 99%, from about 90 to about 99%, from about 90 to about 97%, or from about 80 to about 97%. Triad tacticity may be determined by the methods described in U.S. Pat. No. 7,232,871.

The PBE may have a tacticity index m/r ranging from a lower limit of 4 or 6 to an upper limit of 8 or 10 or 12. The tacticity index, expressed herein as "m/r", is determined by $^{13}$C nuclear magnetic resonance ("NMR"). The tacticity index, m/r, is calculated as defined by H. N. Cheng in Vol. 17, MACROMOLECULES, pp. 1950-1955 (1984), incorporated herein by reference. The designation "m" or "r" describes the stereochemistry of pairs of contiguous propylene groups, "m" referring to meso, and "r" to racemic. An m/r ratio of 1.0 generally describes a syndiotactic polymer, and an m/r ratio of 2.0 describes an atactic material.

The PBE may have a percent crystallinity of from about 0.5% to about 40%, from about 1% to about 30%, or from about 5% to about 25%, determined according to DSC procedures. Crystallinity may be determined by dividing the Hf of a sample by the Hf of a 100% crystalline polymer, which is assumed to be 189 J/g for isotactic polypropylene.

The PBE may have a density of from about 0.84 g/cm$^3$ to about 0.92 g/cm$^3$, from about 0.85 g/cm$^3$ to about 0.90 g/cm$^3$, or from about 0.85 g/cm$^3$ to about 0.87 g/cm$^3$ at room temperature, as measured per the ASTM D-1505 test method.

The PBE can have a melt index (MI) (ASTM D-1238, 2.16 kg @ 190° C.), of less than or equal to about 100 g/10 min, less than or equal to about 50 g/10 min, less than or equal to about 25 g/10 min, less than or equal to about 10 g/10 min, less than or equal to about 8.0 g/10 min, less than or equal to about 5.0 g/10 min, or less than or equal to about 3.0 g/10 min.

The PBE may have a melt flow rate (MFR), as measured according to ASTM D-1238 (2.16 kg weight @ 230° C.), greater than about 0.5 g/10 min, greater than about 1.0 g/10 min, greater than about 1.5 g/10 min, greater than about 2.0 g/10 min, or greater than about 2.5 g/10 min. The PBE may have an MFR less than about 100 g/10 min, less than about 50 g/10 min, less than about 25 g/10 min, less than about 15 g/10 min, less than about 10 g/10 min, less than about 7 g/10 min, or less than about 5 g/10 min. In some embodiments, the PBE may have an MFR from about 0.5 to about 10 g/10 min, from about 1.0 to about 7 g/10 min, or from about 1.5 to about 5 g/10 min.

The PBE may have a g' index value of 0.95 or greater, or at least 0.97, or at least 0.99, wherein g' is measured at the Mw of the polymer using the intrinsic viscosity of isotactic polypropylene as the baseline. For use herein, the g' index is defined as:

$$g' = \frac{\eta_b}{\eta_l}$$

where $\eta b$ is the intrinsic viscosity of the polymer and $\eta l$ is the intrinsic viscosity of a linear polymer of the same viscosity-averaged molecular weight (Mv) as the polymer. $\eta l = KMv\alpha$, K and $\alpha$ are measured values for linear polymers and should be obtained on the same instrument as the one used for the g' index measurement.

The PBE may have a weight average molecular weight (Mw), as measured by DRI, of from about 50,000 to about 1,000,000 g/mol, or from about 75,000 to about 500,000 g/mol, from about 100,000 to about 350,000 g/mol, from about 125,000 to about 300,000 g/mol, from about 150,000 to about 275,000 g/mol, or from about 200,000 to about 250,000 g/mol.

The PBE may have a number average molecular weight (Mn), as measured by DRI, of from about 5,000 to about 500,000 g/mol, from about 10,000 to about 300,000 g/mol, from about 50,000 to about 250,000 g/mol, from about 75,000 to about 200,000 g/mol, or from about 100,000 to about 150,000 g/mol.

The PBE may have a z-average molecular weight (Mz), as measured by MALLS, of from about 50,000 to about 1,000,000 g/mol, or from about 75,000 to about 500,000 g/mol, or from about 100,000 to about 400,000 g/mol, from about 200,000 to about 375,000 g/mol, or from about 250,000 to about 350,000 g/mol.

The molecular weight distribution (MWD, equal to Mw/Mn) of the PBE may be from about 0.5 to about 20, from about 0.75 to about 10, from about 1.0 to about 5, from about 1.5 to about 4, or from about 1.8 to about 3.

Optionally, the PBE may also include one or more dienes. The term "diene" is defined as a hydrocarbon compound that has two unsaturation sites, i.e., a compound having two double bonds connecting carbon atoms. Depending on the context, the term "diene" as used herein refers broadly to either a diene monomer prior to polymerization, e.g., forming part of the polymerization medium, or a diene monomer after polymerization has begun (also referred to as a diene monomer unit or a diene-derived unit). In some embodiments, the diene may be selected from 5-ethylidene-2-norbornene (ENB); 1,4-hexadiene; 5-methylene-2-norbornene (MNB); 1,6-octadiene; 5-methyl-1,4-hexadiene; 3,7-dimethyl-1,6-octadiene; 1,3-cyclopentadiene; 1,4-cyclohexadiene; vinyl norbornene (VNB); dicyclopentadiene (DCPD), and combinations thereof. In embodiments where the propylene-based elastomer composition comprises a diene, the diene may be present at from 0.05 wt % to about 6 wt %, from about 0.1 wt % to about 5.0 wt %, from about 0.25 wt % to about 3.0 wt %, from about 0.5 wt % to about 1.5 wt %, diene-derived units, where the percentage by weight is based upon the total weight of the propylene-derived, α-olefin derived, and diene-derived units.

Optionally, the PBE may be grafted (i.e., "functionalized") using one or more grafting monomers. As used herein, the term "grafting" denotes covalent bonding of the grafting monomer to a polymer chain of the PBE. The grafting monomer can be or include at least one ethylenically unsaturated carboxylic acid or acid derivative, such as an acid anhydride, ester, salt, amide, imide, or acrylates. Illustrative grafting monomers include, but are not limited to, acrylic acid, methacrylic acid, maleic acid, fumaric acid, itaconic acid, citraconic acid, mesaconic acid, maleic anhydride, 4-methyl cyclohexene-1,2-dicarboxylic acid anhydride, bicyclo(2.2.2)octene-2,3-dicarboxylic acid anhydride, 1,2,3,4,5,8,9,10-octahydronaphthalene-2,3-dicarboxylic acid anhydride, 2-oxa-1,3-diketospiro(4.4)nonene, bicyclo (2.2.1)heptene-2,3-dicarboxylic acid anhydride, maleopimaric acid, tetrahydrophthalic anhydride, norbornene-2,3-dicarboxylic acid anhydride, nadic anhydride, methyl nadic anhydride, himic anhydride, methyl himic anhydride, and 5-methylbicyclo(2.2.1)heptene-2,3-dicarboxylic acid anhydride. Other suitable grafting monomers include methyl acrylate and higher alkyl acrylates, methyl methacrylate and higher alkyl methacrylates, acrylic acid, methacrylic acid, hydroxy-methyl methacrylate, hydroxyl-ethyl methacrylate and higher hydroxy-alkyl methacrylates and glycidyl methacrylate. Maleic anhydride is a preferred grafting monomer. In embodiments wherein the graft monomer is maleic anhydride, the maleic anhydride concentration in the grafted polymer is preferably in the range of about 1 to about 6 wt %, at least about 0.5 wt %, or at least about 1.5 wt %.

In some embodiments, the PBE is a reactor blended polymer as defined herein. That is, the PBE is a reactor blend of a first polymer component and a second polymer component. Thus, the comonomer content of the propylene-based elastomer can be adjusted by adjusting the comonomer content of the first polymer component, adjusting the comonomer content of second polymer component, and/or adjusting the ratio of the first polymer component to the second polymer component present in the PBE.

In embodiments where the PBE is a reactor blended polymer, the α-olefin content of the first polymer component ("$R_1$") may be greater than 5 wt % α-olefin, greater than 7 wt % α-olefin, greater than 10 wt % α-olefin, greater than 12 wt % α-olefin, greater than 15 wt % α-olefin, or greater than 17 wt % α-olefin, where the percentage by weight is based upon the total weight of the propylene-derived and α-olefin-derived units of the first polymer component. The α-olefin content of the first polymer component may be less than 30 wt % α-olefin, less than 27 wt % α-olefin, less than 25 wt % α-olefin, less than 22 wt % α-olefin, less than 20 wt % α-olefin, or less than 19 wt % α-olefin, where the percentage by weight is based upon the total weight of the propylene-derived and α-olefin-derived units of the first polymer component. In some embodiments, the α-olefin content of the first polymer component may range from 5 wt % to 30 wt % α-olefin, from 7 wt % to 27 wt % α-olefin, from 10 wt % to 25 wt % α-olefin, from 12 wt % to 22 wt % α-olefin, from 15 wt % to 20 wt % α-olefin, or from 17 wt % to 19 wt % α-olefin. Preferably, the first polymer component comprises propylene and ethylene, and in some embodiments the first polymer component consists only of propylene and ethylene derived units.

In embodiments where the PBE is a reactor blended polymer, the α-olefin content of the second polymer component ("$R_2$") may be greater than 1.0 wt % α-olefin, greater than 1.5 wt % α-olefin, greater than 2.0 wt % α-olefin, greater than 2.5 wt % α-olefin, greater than 2.75 wt % α-olefin, or greater than 3.0 wt % α-olefin, where the percentage by weight is based upon the total weight of the propylene-derived and α-olefin-derived units of the second polymer component. The α-olefin content of the second polymer component may be less than 10 wt % α-olefin, less than 9 wt % α-olefin, less than 8 wt % α-olefin, less than 7 wt % α-olefin, less than 6 wt % α-olefin, or less than 5 wt % α-olefin, where the percentage by weight is based upon the total weight of the propylene-derived and α-olefin-derived units of the second polymer component. In some embodiments, the α-olefin content of the second polymer component may range from 1.0 wt % to 10 wt % α-olefin, or from 1.5 wt % to 9 wt % α-olefin, or from 2.0 wt % to 8 wt % α-olefin, or from 2.5 wt % to 7 wt % α-olefin, or from 2.75 wt % to 6 wt % α-olefin, or from 3 wt % to 5 wt % α-olefin. Preferably, the second polymer component comprises propylene and ethylene, and in some embodiments the first polymer component consists only of propylene and ethylene derived units.

In embodiments where the PBE is a reactor blended polymer, the PBE may comprise from 1 to 25 wt % of the second polymer component, from 3 to 20 wt % of the second polymer component, from 5 to 18 wt % of the second polymer component, from 7 to 15 wt % of the second polymer component, or from 8 to 12 wt % of the second polymer component, based on the weight of the propylene-based elastomer. The PBE may comprise from 75 to 99 wt % of the first polymer component, from 80 to 97 wt % of the first polymer component, from 85 to 93 wt % of the first polymer component, or from 82 to 92 wt % of the first polymer component, based on the weight of the propylene-based elastomer.

The PBE may be prepared by any suitable means as known in the art. The PBE are preferably prepared using homogeneous conditions, such as a continuous solution polymerization process, using a metallocene catalyst. In some preferred embodiments, the PBE are prepared in parallel solution polymerization reactors, such that the first reactor component is prepared in a first reactor and the second reactor component is prepared in a second reactor, and the reactor effluent from the first and second reactors are combined and blended to form a single effluent from which the final PBE is separated. Exemplary methods for the preparation of PBEs may be found in U.S. Pat. Nos. 6,881,800; 7,803,876; 8,013,069; and 8,026,323 and PCT Publications WO 2011/087729; WO 2011/087730; and WO 2011/087731.

Polyalphaolefin

In general polyalphaolefins (PAOs) are oligomers of α-olefins (also known as 1-olefins) and are often used as the base stock for synthetic lubricants. PAOs are typically produced by the polymerization of α-olefins, preferably linear α-olefins. A PAO may be characterized by any type of tacticity, including isotactic or syndiotactic and/or atactic, and by any degree of tacticity, including isotactic-rich or syndiotactic-rich or fully atactic. PAO liquids are described in, for example, U.S. Pat. Nos. 3,149,178; 4,827,064; 4,827,073; 5,171,908; and 5,783,531; and in SYNTHETIC LUBRICANTS AND HIGH-PERFORMANCE FUNCTIONAL FLUIDS, Leslie R. Rudnick & Ronald L. Shubkin, eds. (Marcel Dekker, 1999), pp. 3-52. PAOs are Group 4 compounds, as defined by the American Petroleum Institute (API).

Useful PAOs may be made by any suitable means known in the art. For example, the PAOs may be prepared by the oligomerization of an α-olefin in the presence of a polymerization catalyst, such as a Friedel-Crafts catalyst (including, for example, $AlCl_3$, $BF_3$, and complexes of $BF_3$ with water, alcohols, carboxylic acids, or esters), a coordination complex catalyst (including, for example, the ethylaluminum sesquichloride+$TiCl_4$ system), or a homogeneous or heterogeneous (supported) catalyst more commonly used to make polyethylene and/or polypropylene (including, for example, Ziegler-Natta catalysts, metallocene or other single-site catalysts, and chromium catalysts). Subsequent to the polymerization, the PAO may be hydrogenated in order to reduce any residual unsaturation. PAO's may be hydrogenated to yield substantially (>99 wt. %) paraffinic materials. The PAO's may also be functionalized to comprise, for example, esters, polyethers, polyalkylene glycols, and the like.

The percentage of carbons in chain-type paraffinic structures ($C_P$) is close to 100% (typically greater than 98% or even 99%) for PAOs.

In general, PAOs are high purity hydrocarbons with a paraffinic structure and a high-degree of side-chain branching. The PAO may have irregular branching or regular branching. The PAO may comprise oligomers or low molecular weight polymers of branched and/or linear alpha olefins. In some embodiments, the PAO comprises $C_6$ to $C_{2000}$, or $C_8$ to $C_{1500}$, or $C_{10}$ to $C_{1000}$, or $C_{15}$ to $C_{800}$, or $C_{20}$ to $C_{400}$, or $C_{30}$ to $C_{250}$ oligomers of α-olefins. These oligomers may be dimers, trimers, tetramers, pentamers, etc. In some embodiments, the PAO comprises $C_2$ to $C_{24}$, preferably $C_5$ to $C_{18}$, more preferably $C_6$ to $C_{14}$, even more preferably $C_8$ to $C_{12}$, most preferably $C_{10}$ branched or linear α-olefins. In some embodiments, the PAO comprises $C_3$ to $C_{24}$, preferably $C_5$ to $C_8$, more preferably $C_6$ to $C_{14}$, most preferably $C_8$ to $C_{12}$ linear α-olefins (LAOs). Suitable olefins include 1-butene, 1-pentene, 1-hexene, 1-heptene, 1-octene, 1-nonene, 1-decene, 1-undecene, 1-dodecene, 1-tridecene, 1-tetradecene, 1-pentadecene, 1-hexadecene, and blends thereof. Oligomers of LAOs with only even carbon numbers between 6 and 18 (inclusive) are particularly preferred. Preferably $C_2$, $C_3$, and $C_4$ α-olefins (i.e., ethylene, propylene and 1-butene and/or isobutylene) are present in the PAO oligomers at an average concentration of 30 wt % or less, or 20 wt % or less, or 10 wt % or less, or 5 wt % or less; more preferably $C_2$, $C_3$, and $C_4$ α-olefins are not present in the PAO oligomers. Useful PAOs are described more particularly in, for example, U.S. Pat. Nos. 5,171,908 and 5,783,531, both of which are herein incorporated by reference.

In some embodiments, a single LAO is used to prepare the oligomers. For example, the PAO may be formed by the oligomerization of 1-decene, and the PAO is a mixture of oligomers (including, for example, dimers, trimers, tetramers, pentamers, and higher) of 1-decene.

In some embodiments, the PAO may comprise a blend of oligomers of two or more $C_3$ to $C_{18}$ LAOs (preferably $C_5$ to $C_{18}$ LAOs), to make 'bipolymer' or 'terpolymer' or higher-order copolymer combinations, provided that $C_3$ and $C_4$ LAOs are present at 10 wt % or less. For example, a preferred embodiment involves the oligomerization of a mixture of 1-octene, 1-decene, and 1-dodecene, and the PAO is a mixture of oligomers (for example, dimers, trimers, tetramers, pentamers, and higher) of 1-octene/1-decene/1-dodecene 'terpolymer'.

In some embodiments, the PAO comprises oligomers of a single α-olefin species having a carbon number of 5 to 24 (preferably 6 to 18, preferably 8 to 12, most preferably 10). In some embodiments, the PAO comprises oligomers of mixed α-olefins (i.e., involving two or more α-olefin species), each α-olefin having a carbon number of 3 to 24 (preferably 5 to 24, preferably 6 to 18, most preferably 8 to 12), provided that α-olefins having a carbon number of 3 or 4 are present at 10 wt % or less. In a particularly preferred embodiment, the PAO comprises oligomers of mixed α-olefins (i.e., involving two or more α-olefin species) where the weighted average carbon number for the α-olefin mixture is 6 to 14 (preferably 8 to 12, preferably 9 to 11).

In another embodiment, the PAO comprises oligomers of one or more α-olefin with repeat unit formulas of:

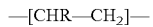

where R is a $C_3$ to $C_{18}$ saturated hydrocarbon branch. Preferably R is constant for all oligomers. In another embodiment, there is a range of R substituents covering carbon numbers from 3 to 18. Preferably R is linear, i.e.,

where z is 2 to 17 (preferably 3 to 11, preferably 4 to 9).

Optionally, R may contain one methyl or ethyl branch, i.e.,

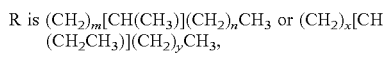

where (m+n) is 1 to 15 (preferably 1 to 9, preferably 3 to 7) and (x+y) is 1 to 14 (preferably 1 to 8, preferably 2 to 6). Preferably m>n. Preferably m is 0 to 15 (preferably 2 to 15, preferably 3 to 12, preferably 4 to 9) and n is 0 to 10 (preferably 1 to 8, preferably 1 to 6, preferably 1 to 4). Preferably x>y. Preferably x is 0 to 14 (preferably 1 to 14, preferably 2 to 11, preferably 3 to 8) and y is 0 to 10 (preferably 1 to 8, preferably 1 to 6, preferably 1 to 4). Preferably the repeat units are arranged in a head-to-tail fashion with minimal heat-to-head connections.

The PAO may be atactic, isotactic, or syndiotactic. In one embodiment, the PAO has essentially the same population of meso [m] and racemic [r] dyads (preferably neither [m] nor [r] greater than 60%, preferably neither greater than 55%) as measured by $^{13}$C-NMR, making it atactic. In another embodiment, the PAO has more than 60% (preferably more than 70%, preferably more than 80%, preferably more than 90%) meso dyads [m]. In another embodiment, the PAO has more than 60% (preferably more than 70%, preferably more than 80%, preferably more than 90%) racemic dyads [r]. In one embodiment, [m]/[r] determined by $^{13}$C-NMR is between 0.9 and 1.1 in one embodiment, [m]/[r] is greater than 1 in another embodiment, and [m]/[r] is less than 1 in yet another embodiment.

Preferred PAOs have a "branching ratio" as defined in U.S. Pat. No. 4,827,064 and measured according to the method described therein, of 0.20 or less, preferably 0.19 or less, preferably 0.18 or less, preferably 0.17 or less, preferably 0.15 or less, preferably 0.12 or less, preferably 0.10 or less.

The PAO may have a number average molecular weight ($M_n$) in the range of $1.00 \times 10^2$ to $2.10 \times 10^4$ g/mol or $3.00 \times 10^2$ to $1.50 \times 10^4$ g/mol, or in the range of $2.00 \times 10^2$ to $1.00 \times 10^4$, or $2.00 \times 10^2$ to $7.00 \times 10^3$, or $6.00 \times 10^2$ to $3.00 \times 10^3$, or $2.00 \times 10^2$ to $2.00 \times 10^3$, or $2.00 \times 10^2$-$5.00 \times 10^2$ g/mol.

The PAOs may have a weight average molecular weight ($M_w$) of less than 10,000 g/mol, or less than 5,000 g/mol, or less than 4,000 g/mol, or less than 2,000 g/mol, or less than 1,000 g/mol. In some embodiments, the PAO may have an $M_w$ of 250 g/mol or more, 400 g/mol or more, or 500 g/mol or more, or 600 g/mol or more, or 700 g/mol or more, or 750 g/mol or more. In some embodiments, the PAO may have a Mw in the range of from 250 to 10,000 g/mol, or from 400 to 5,000 g/mol, or form 500 to 4,000 g/mol, or from 600 to 2000 g/mol, or from 700 to 1000 g/mol. The molecular weight of the PAO can be determined by GPC method using a column for medium to low molecular weight polymers, tetrahydrofuran as solvent and polystyrene as calibration standard, correlated with the fluid viscosity according to a power equation. Unless otherwise indicated Mw values reported herein are GPC values and are not calculated from kinematic viscosity at 100° C.

Useful PAOs have a kinematic viscosity ("KV") at 100° C., as measured by ASTM D445 at 100° C., of 3 cSt (1 cSt=1 mm²/s) to 3,000 cSt, 4 to 1,000 cSt, 6 to 300 cSt, 8 to 125 cSt, 8 to 100 cSt, or 10 to 60 cSt. In some embodiments, the PAO has a KV at 100° C. of 5 to 1000 cSt, preferably 6 to 300 cSt, preferably 7 to 100 cSt, or 8 to 50 cSt.

Useful PAOs have a kinematic viscosity ("KV") as measured by ASTM D445 at 40° C. of 5.0 to about 500 cSt, about 10 to 300 cSt, or 20 to 200 cSt, or 30 to 100 cSt, or 40 to 80 cSt, or 50 to 75 cSt.

The PAOs may also have a viscosity index ("VI"), as determined by ASTM D2270, of 50 to 400, or 60 to 350, or 70 to 250, or 80 to 200, or preferably 90 to 175, or 100 to 150.

The PAO may have a pour point, as determined by ASTM D5950/D97, of $-100°$ C. to 0° C., $-100°$ C. to $-10°$ C., $-90°$ C. to $-15°$ C., $-80°$ C. to $-20°$ C. In some embodiments, the PAO or blend of PAOs has a pour point of $-25$ to $-75°$ C., preferably $-40$ to $-60°$ C.

The PAO may have a flash point, as determined by ASTM D92, of 150° C. or more, 200° C. or more, 210° C. or more, 220° C. or more, 230° C. or more, preferably between 240° C. and 290° C.

The PAO may have a specific gravity (15.6/15.6° C., 1 atm/1 atm) of 0.79 to 0.90, preferably 0.80 to 0.89, preferably 0.81 to 0.88, preferably 0.82 to 0.87, 0.83 to 0.86.

Particularly preferred PAOs are those having (a) a flash point of 200° C. or more, 210° C. or more, 220° C. or more, or 230° C. or more; and (b) a pour point less than $-20°$ C., less than $-25°$ C., less than $-30°$ C., less than $-35°$ C., or less than $-40°$ C., and (c) a KV at 100° C. of 2 cSt or more, 4 cSt or more, 5 cSt or more, 6 cSt or more, 8 cSt or more.

Further preferred PAOs have a KV at 100° C. of at least 5 to 50 cSt, particularly 8 to 20 cSt; a pour point of $-25$ to $-75°$ C., preferably $-40$ to $-60°$ C.; and a specific gravity of 0.81 to 0.87, preferably 0.82 to 0.86.

The PAO may be comprised of one or more distinct PAO components. In one embodiment, the PAO is a blend of one or more oligomers with different compositions (e.g., different α-olefin(s) were used to make the oligomers) and/or different physical properties (e.g., KV, pour point, VI, and/or $T_g$).

Useful PAOs are available include certain grades of SpectraSyn™ and SpectraSyn Ultra™ available from ExxonMobil Chemical Company (Houston, Tex., USA). Other useful PAOs include certain grades of Synfluid™ available from ChevronPhillips Chemical Company (Pasadena, Tex., USA), Durasyn™ available from Innovene (Chicago, Ill., USA), Nexbase™ available from Neste Oil (Keilaniemi, Finland), and Synton™ available from Chemtura Corporation (Middlebury, Conn., USA).

Nucleating Agent

In some embodiments, the compositions described herein comprise at least one nucleating agent, preferably a β-nucleating agent, as described herein.

Polypropylene polymers are generally capable of crystallizing in three forms: the alpha, beta and gamma forms. In melt-crystallized isotactic polypropylene the predominant polymorph is typically the alpha or monoclinic form while the beta form generally occurs at low levels. The alpha form is typically preferred as it is known to produce more stable crystallization. However, as described herein, the inventors have unexpectedly found that while alpha nucleating agents work with traditional isotactic polypropylenes they do not produce adequate crystallization in the PBEs and PBE/PAO blends described herein. As such, compositions that comprises PBEs or PBE/PAO blends and alpha nucleating agents tend to not crystallize quickly enough, thus leading to changes in the composition properties over time.

The β-nucleating agent may be selected from the group consisting of amide compounds of the formula (1), formula (2), or formula (3), as described below.

In some embodiments, an amide compound of formula (1) may be used:

$$R^2\text{—NHCO—}R^1\text{—CONH—}R^3 \quad (1)$$

wherein $R^1$ is a residue of a $C_{3-20}$ saturated or unsaturated aliphatic dicarboxylic acid, a residue of a $C_{6-30}$ saturated or unsaturated alicycic dicarboxylic acid or a residue of a $C_{8-30}$ aromatic dicarboxylic acid; $R^2$ and $R^3$ are the same or different and each represents a $C_{3-12}$ cycloalkyl group, a $C_{3-12}$ cycloalkenyl group, or a group of the formula

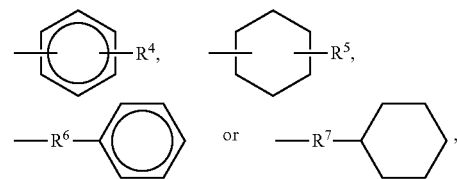

wherein $R^4$ is a hydrogen atom, a $C_{1-12}$ straight- or branched-chain alkyl group, a $C_{2-12}$ straight- or branched chain alkenyl group, a $C_{6-10}$ cycloalkyl group or a phenyl group; $R^5$ is a $C_{1-12}$ straight- or branched-chain alkyl group, a $C_{2-12}$ straight- or branched-chain alkenyl group, a $C_{6-10}$ cycloalkyl group or a phenyl group; and $R^6$ and $R^7$ each represents a $C_{1-4}$, straight- or branched-chain alkylene group; with the proviso that when $R^4$ is a hydrogen atom, a $C_{1-12}$ alkyl group or a $C_{6-10}$ cycloalkyl group, $R^1$ is a residue of a $C_6$ or $C_8$ saturated aliphatic dicarboxylic acid.

For example, preferred amide compounds of formula (1) may be those where $R^1$ is —$(CH_2)_4$—,

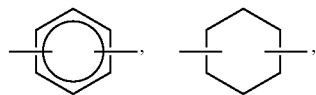

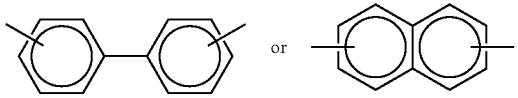 or 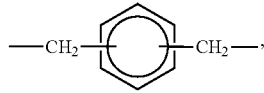

and R² and R³ are the same or different and each represents a C$_{6-8}$ cycloalkyl group or represents a phenyl group substituted by a C$_{1-4}$ alkyl or cyclohexyl group.

Other preferred amide compounds of formula (1) include those of formula (4):

$$R^{19}—NHCO—R^{18}—CONH—R^{20} \quad (4)$$

wherein R$^{18}$ means

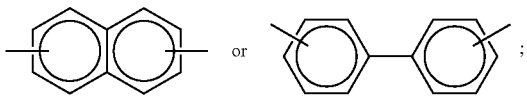

and R$^{19}$ and R$^{20}$ may be the same or different and each means a C$_{5-12}$ cycloalkyl group.

Other preferred amide compounds of formula (1) include N,N'-dicyclohexylterephthalamide, N,N'-dicyclohexyl-2,6-naphthalenedicarboxamide, N,N'-dicyclooctyl-2,6-naphthalenedicarboxamide, N,N'-dicyclohexyl-1,4-cyclohexanedicarboxamide, N,N'-dicyclohexyl-4,4'-biphenyldicarboxamide, N,N'-bis(p-methylphenyl)hexanediamide, N,N'-bis(p-ethylphenyl)hexanediamide, N,N'-bis(4-cyclohexylphenyl)hexanediamide, N,N'-diphenylhexanediamide, and N,N'-diphenyloctanediamide. In some preferred embodiments, the amide compound may be selected from N,N'-dicyclohexyl-2,6-naphthalenedicarboxamide and N,N'-dicyclooctyl-2,6-naphthalenedicarboxamide. In some preferred embodiments, the amide compound may be N,N'-dicyclohexyl-2,6-naphthalenedicarboxamide.

In some embodiments, an amide compound of formula (2) may be used:

$$R^9—CONH—R^8—NHCO—R^{10} \quad (2)$$

wherein R$^8$ is a residue of a C$_{4-28}$ alicyclic diamine, a residue of a C$_{4-14}$ heterocyclic diamine or a residue of a C$_{6-28}$ aromatic diamine; R$^9$ and R$^{10}$ are the same or different and each represents a C$_{3-12}$ cycloalkyl group, a C$_{3-12}$ cycloalkenyl group, or a group of the formula

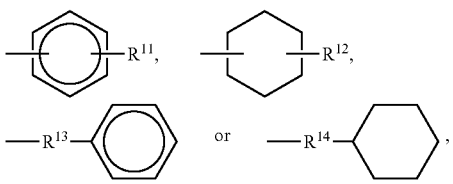

wherein R$^{11}$ is a hydrogen atom, a C$_{1-12}$ straight- or branched-chain alkyl group, a C$_{2-12}$ straight- or branched chain alkenyl group, a C$_{6-10}$ cycloalkyl group or a phenyl group; R$^{12}$ is a C$_{1-12}$ straight- or branched-chain alkyl group, a C$_{2-12}$ alkenyl group, a C$_{6-10}$ cycloalkyl group or a phenyl group; and R$^{13}$ and R$^{14}$ each represents a C$_{1-4}$ straight- or branched-chain alkylene group; with the proviso that R$^8$ is not

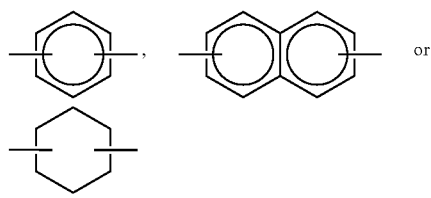

For example, preferred amide compounds of formula (2) may be those where R$^8$ is

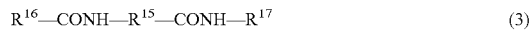

and R$^9$ and R$^{10}$ are the same or different and each is a cyclohexyl group or a phenyl group.

For example, amide compounds of formula (2) that may be used include those selected from N,N'-1,4-phenylenebiscyclohexanecarboxamide, N,N'-1,5-naphthalenebisbenzamide, N,N'-1,4-cyclohexanebis-benzamide, and N,N'-1,4-cyclohexanebis-cyclohexanecarboxamide In some embodiments, an amide compound of the formula (3) may be used:

$$R^{16}—CONH—R^{15}—CONH—R^{17} \quad (3)$$

wherein R$^{15}$ is a residue of a C$_{2-29}$ saturated or unsaturated aliphatic amino acid, a residue of a C$_{7-13}$ saturated or unsaturated alicyclic amino acid or a residue of a C$_{7-15}$ aromatic amino acid; R$^{16}$ and R$^{17}$ are the same or different and R$^{16}$ has the same meaning as R$^9$ or R$^{10}$ in the formula (2) and R$^{17}$ has the same meaning as R$^2$ or R$^3$ in the formula (1).

For example, amide compounds of formula (3) that may be used include those selected from N-cyclohexyl-4-(Ncyclohexylcarbonylamino)-benzamide and N-phenyl-5-(Nbenzoylamino)pentanamide.

The amide compounds of formulas (1), (2), and (3) can be produced by any process known to those in the art, and for example, may be produced by the processes described in U.S. Pat. No. 6,235,823.

Dust

In some embodiments, the compositions comprising the PBE and PAO may be dusted with a dusting agent as described herein.

Preferably, the dusting agent is a polymeric powder, and in preferred embodiments is a dust comprising an ethylene-based polymer. For example, the dusting agent may be a polyethylene powder such as low density polyethylene or a linear low density polyethylene.

Preferably the dusting agent comprises an ethylene-based polymer, and may be for example a homopolymer of ethylene or a copolymer of ethylene and at least one ethylenically unsaturated monomer selected from the group consisting of C3-C10 α-olefins. Exemplary ethylene copolymers include ethylene-propylene, ethylene-butene, and ethylene-1-octene copolymers. In some embodiments, the ethylene-based polymer is a high density polyethylene (HDPE); a linear low density polyethylene (LLDPE); an ultra low linear low density polyethylene (ULDPE); or a low density polyethylene (LDPE).

Blend compositions comprising the PBE and PAO, as described herein, may be contacted with an effective amount of the dusting agent. It is not necessary that each particle or pellet be totally covered with the dusting agent. In addition, it is not necessary that every particle be covered with any dusting agent. Usually, the particles are sufficiently dusted such that the average amount of surface dusting is above about 50 percent.

In some embodiments the blend compositions are dusted with at least about 0.05 wt %, or at least about 0.1 wt %, or at least about 0.3 wt %, or at least about 0.5 wt %, or at least about 0.7 wt %, or at least about 0.8 wt %, or at least about 1.0 wt %, or at least about 1.5 wt %, of the dusting agent based on the total weight of the blend composition.

The blend composition may be dusted several different ways, including simple admixing, agitation, tumbling, airveying, strand pelletizing, under water pelletizing, and combinations thereof. Exemplary blending equipment/processes include any mechanical means of moving the pellets such as simple tumbling, or blending in a conical rotating vessel, ribbon blender, drum tumbler, paddle blender, agglomeration pan, fluidized bed pneumatic conveyor under air or inert gas, stirring, shaking, screw conveyor or mixing pellets through recirculation in vessels (e.g., silos). Strand pelletizing processes extrude the blend composition into strands that are then dusted and cut into pellets.

Blend Compositions

Compositions according to the present invention comprise at least one PBE and at least one PAO. In some embodiments, the compositions may comprise one propylene-based elastomer and one PAO, while in other embodiments, the composition may comprise a blend of propylene-based elastomers blended with one PAO, or one propylene-based elastomer blended with a blend of PAOs, or blends of propylene-based elastomers blended with a blend of PAOs.

The composition may comprise, at least about 0.5 wt % PAO, or at least about 1 wt % PAO, or at least about 2 wt % PAO, or at least about 3 wt % PAO, or at least about 4 wt % PAO, or at least about 5 wt % PAO, or at least about 6 wt % PAO, or at least about 7 wt % PAO, or at least about 8 wt % PAO, or at least about 9 wt % PAO, or at least about 10 wt % PAO, based on the weight of the blend composition. The composition may comprise up to about 60 wt % PAO, up to about 55 wt % PAO, up to about 50 wt % PAO, up to about 45 wt % PAO, up to about 40 wt % PAO, up to about 35 wt % PAO, up to about 30 wt % PAO, up to about 25 wt % PAO, or up to about 20 wt % PAO, based on the weight of the blend composition.

In some embodiments the composition may comprise from about 0.5 to 60 wt % PAO, from about 1 to 50 wt % PAO, from about 1 to 40 wt % PAO, from about 1 to 20 wt % PAO, from about 2 to 45 wt % PAO, or from about 5 to 40 wt % PAO, based on the weight of the blend composition. In some embodiments, the composition is a lean blend and may comprise from about 0.5 to 20 wt % PAO, from about 1 to 15 wt % PAO, or from about 2 to 10 wt % PAO, based on the weight of the blend composition. In other embodiments, the composition is a concentrated blend and may comprise from about 10 to about 60 wt % PAO, from about 15 to 50 wt % PAO, from about 20 to 45 wt % PAO, or from about 30 to 45 wt % PAO, based on the weight of the blend composition.

The composition may comprise at least 40 wt % PBE, at least 45 wt % PBE, at least 50 wt % PBE, at least 55 wt % PBE, at least 60 wt % PBE, at least 65 wt % PBE, at least 70 wt % PBE, at least 75 wt % PBE, or at least 80 wt % PBE, based on the weight of the blend composition. The composition may comprise up to about 99.5 wt % PBE, up to about 99 wt % PBE, up to about 98 wt % PBE, up to about 97 wt % PBE, up to about 96 wt % PBE, up to about 95 wt % PBE, up to about 94 wt % PBE, up to about 93 wt % PBE, up to about 92 wt % PBE, up to about 91 wt % PBE, or up to about 90 wt % PBE, based on the weight of the blend composition.

In some embodiments, the composition may comprise from 40 to 99.5 wt % PBE, from 50 to 99 wt % PBE, from 60 to 99 wt % PBE, from 80 to 99 wt % PBE, from 75 to 98 wt % PBE, or from 60 to 95 wt % PBE, based on the weight of the blend composition. In some embodiments, the composition is a lean blend and may comprise from about 80 to 99.5 wt % PBE, from about 85 to 99 wt % PBE, or from about 90 to 98 wt % PBE, based on the weight of the blend composition. In other embodiments, the composition is a concentrated blend and may comprise from about 40 to 90 wt % PBE, from 50 to 85 wt % PBE, from 55 to 80 wt % PBE, or from 55 to 70 wt % PBE, based on the weight of the blend composition.

The composition may have a MFR, as measured according to ASTM D-1238 (2.16 kg weight @ 230° C.), greater than about 0.5 g/10 min, greater than about 1.0 g/10 min, greater than about 1.5 g/10 min, greater than about 2.0 g/10 min, greater than about 2.5 g/10 min, greater than about 3 g/10 min, greater than about 3.5 g/10 min, or greater than about 4 g/10 min. The composition may have an MFR less than about 100 g/10 min, less than about 50 g/10 min, less than about 25 g/10 min, less than about 15 g/10 min, less than about 10 g/10 min, or less than about 7 g/10 min. In some embodiments, the blend composition may have an MFR from about 0.5 to about 15 g/10 min, from about 1.0 to about 10 g/10 min, or from about 3 to about 7 g/10 min.

A variety of additives may be incorporated into the blend compositions described herein, depending upon the intended purpose of the blend. For example, when the blends are used to form films, fibers, and nonwoven fabrics, such additives may include but are not limited to stabilizers, antioxidants, fillers, colorants, dispersing agents, mold release agents, slip agents, fire retardants, plasticizers, pigments, vulcanizing or curative agents, vulcanizing or curative accelerators, cure retarders, processing aids, tackifying resins, and the like. Other additives may include fillers and/or reinforcing materials, such as carbon black, clay, talc, calcium carbonate, mica, silica, silicate, combinations thereof, and the like. Primary and secondary antioxidants include, for example, hindered phenols, hindered amines, and phosphates. Other additives such as dispersing agents, for example, Acrowax C, can also be included. Slip agents include, for example, oleamide and erucamide. Catalyst deactivators are also commonly used, for example, calcium stearate, hydrotalcite, and calcium oxide, and/or other acid neutralizers known in the art.

In some embodiments, additives may be incorporated into the blend compositions directly or as part of a masterbatch, i.e., an additive package containing several additives to be added at one time in predetermined proportions. The masterbatch may be added in any suitable amount to accomplish the desired result. For example, a masterbatch comprising an additive may be used in an amount ranging from about 0.1 to about 10 wt %, or from about 0.25 to about 7.5 wt %, or from about 0.5 to about 5 wt %, or from about 1 to about 5 wt %, or from about 2 to about 4 wt %, based on the total weight of the polymer blend and the masterbatch.

In preferred embodiments, the blend composition comprises a nucleating agent, such as the β-nucleating agents described herein. For example, the blend composition may comprise at least 0.1 wt %, or at least 0.5 wt %, or at least 1 wt % of the nucleating agent, based on the weight of the blend composition. For example, the blend composition may comprise less than 20 wt %, or less than 15 wt %, or less than 10 wt %, or less than 7 wt %, or less than 5 wt %, or less than 3 wt % of the nucleating agent, based on the weight of the blend composition.

The blend compositions described herein may be formed by combining the propylene-based elastomer and the polyalphaolefin, nucleating agent, and other optional fillers and additives using any suitable means known in the polymer processing art. Those skilled in the art will be able to determine the appropriate methods to enable intimate mixing while also achieving process economy. For example, the components may be blended in a tumbler, continuous mixer, static mixer, batch mixer, extruder, or a combination thereof that is sufficient to achieve an adequate dispersion of the components. For example, the components may be melt-blended in a batch mixer, such as a Banbury™ or Brabender™ mixer.

In some embodiments, the blend composition is prepared by a method that comprises combining the PBE and PAO components and then pelletizing the blend compositions. Without being bound by theory, it is believed that, by pelletizing the blend composition before forming a fabricated article that a more uniform dispersion of the PAO within the PBE is achieved. This in turn allows for a more uniform dispersion of the PAO within the fabricated article, allowing for improvements in softness of stretch of the fabricated article. Therefore, in some embodiments, the fabricated article may be prepared by a method comprising the steps of: (a) combining (i) a propylene-based elastomer comprising from 5 to 25 wt % ethylene-derived units, based on total weight of the propylene-based elastomer and (ii) a polyalphaolefin to form a blend; (b) pelletizing the blend to form a pellet composition; and (c) using the pellet composition to form a fabricated article. In some embodiments, the nucleating agent is added in step (a). In some embodiments, the method may further comprise a further step between steps (b) and (c) of blending the pellet composition with a nucleating agent and forming a second pellet composition which is then used to form the fabricated article in step (c). In some embodiments, the method may further comprise dusting the pelletized blend as described herein.

In some embodiments, the method of blending may be to melt blend the components in an extruder, such as a single-screw extruder or a twin-screw extruder. Extrusion technology for polymer blends is well known in the art, and is described in more detail in, for example, PLASTICS EXTRUSION TECHNOLOGY, F. Hensen, Ed. (Hanser, 1988), pp. 26-37, and in POLYPROPYLENE HANDBOOK, E. P. Moore, Jr. Ed. (Hanser, 1996), pp. 304-348. For example, the PAO may be directly injected into the polymer melt using a liquid injection device at some point along the barrel, as in the case of a twin-screw extruder, or through an opening in a hollow screw shaft, as in the case of a single-screw extruder. PAO is preferably added downstream from the polymer melt zone, but alternatively the PAO can be added at a point where the polymer(s) have not fully melted yet. For example, in a twin-screw extruder, PAO can be injected after the first barrel section (preferably after the first third of the barrel, more preferably in the last third of the barrel). A PAO addition point may be on top of conveying elements of screw, or on top of liquid mixing elements of screw, or prior to kneading elements of screw, or prior to liquid mixing elements of the screw. The extruder may have more than one (preferably two or three) PAO addition points along the barrel or screw shaft. Optionally, the PAO can be added via the extruder feed throat.

The components may also be blended by a combination of methods, such as dry blending followed by melt blending in an extruder, or batch mixing of some components followed by melt blending with other components in an extruder. One or more components may also be blended using a double-cone blender, ribbon blender, or other suitable blender, or in a Farrel Continuous Mixer (FCM™).

Blending may also involve a "masterbatch" approach, where the target PAO concentration is achieved by combining neat propylene-based elastomer(s) and optionally thermoplastic polyolefin(s) and fillers and/or additives with an appropriate amount of pre-blended masterbatch (i.e., a blend of the propylene-based elastomer, PAO, and optionally the thermoplastic polyolefin and the filler and additives that have been previously prepared at a higher concentration of PAO than desired in the final blend). This is a common practice in polymer processing, typically used for addition of color, additives, and fillers to final compositions. Dispersion (or "letdown") of the masterbatch may take place as part of a processing step used to fabricate articles, such as in the extruder on an injection molding machine or on a continuous extrusion line, or during a separate compounding step.

The use of the β-nucleating agents and/or the dusting agents described herein can allow the blends of the PBE and PAO to crystallize at higher temperatures and/or crystallize faster. For example, the blends described herein may exhibit crystallization at temperatures of greater than 50° C., or greater than 55° C., or greater than 60° C., or greater than 65° C., or greater than or equal to 70° C.

The blend compositions described herein exhibit a DSC crystallization half-time (i) at 40° C. of less than 4 minutes, or less than 3 minutes, or less than 2 minutes; (ii) at 50° C. of less than 6 minutes, or less than 5 minutes, or less than 4 minutes, or less than 3 minutes; (iii) at 60° C. of less than 10 minutes, or less than 9 minutes, or less than 8 minutes, or less than 7 minutes, or less than 6 minutes, or less than 5 minutes, or less than 4 minutes; and/or (iv) at 70° C. of less than 10 minutes, or less than 9 minutes, or less than 8 minutes, or less than 7 minutes, or less than 6 minutes, or less than 5 minutes. The isothermal crystallization can be measured using differential scanning calorimetry (DSC) by heating the polymer samples to 200° C., holding the sample for five (5) minutes at 200° C., and then cooling down the sample (as described below) to the temperature at question and allowing the polymer to crystallize at the specified temperature. The half-time (minutes) is the time required to develop one-half (½) of the total crystallinity at a given temperature.

To measure the isothermal crystallization at 40 and 50° C. by DSC the sample is (1) heated to 200° C. and held at that temperature for 5 minutes; (2) cooled from 200° C. to 70° C. at 150° C./min; (3) cooled from 70° C. to 50° C. at 40° C./min; (4) held for 45 minutes at 50° C. (where the crystallization half-time is measured); (5) heated from 50° C. to 200° C. at 150° C./min; (6) held at 200° C. for 5 minutes; (7) cooled from 200° C. to 60° C. at 150° C./min; (8) cooled from 60° C. to 40° C. at 40° C./min; and (9) held for 45 minutes at 40° C. (where the crystallization half-time is measured.

To measure the isothermal crystallization at 60 and 70° C. by DSC the sample is (1) heated to 200° C. and held at that temperature for 5 minutes; (2) cooled from 200° C. to 90° C. at 150°/min; (3) cooled from 90° C. to 70° C. at 40° C./min; (4) held at 70° C. for 45 minutes (where the crystallization half-time is measured); (5) heated from 70° C. to 200° C. at 150°/min; (6) held at 200° C. for 5 minutes; (7) cooled from 200° C. to 80° C. at 150° C./min; (8) cooled from 80° C. to 60° C. at 40°/min; (9) held at 60° C. for 45 minutes (where the crystallization half-time is measured); (10) heated from 60° C. to 200° C. at 40° C./min; and (11) held for 2 minutes at 200° C.

As the blends described herein exhibit an onset of crystallization at higher temperatures, this can allow a film comprising the blend to crystallize at process/fabrication temperatures. As the film has begun to crystallize during the fabrication process, this allows the film's mechanical properties to stay constant and not change over time. Thus when the film is used to make an elastic laminate, the laminate properties (e.g., max load) will also be more constant over time Films Prepared from the Blend Composition Films may be prepared from the blend compositions described herein. The film may be formed by any number of well-known extrusion or co-extrusion techniques. For example, any of the blown or chill roll techniques are suitable. For example, the blend composition may be extruded in a molten state through a flat die and then cooled. Alternatively, the blend composition may be extruded in a molten state through an annular die and then blown and cooled to form a tubular film. The tubular film may be axially slit and unfolded to form a flat film. The films may be unoriented, uniaxially oriented or biaxially oriented.

Multiple-layer films may also be formed using methods well known in the art. For example, layer components may be coextruded through a coextrusion feedblock and die assembly to yield a film with two or more layers adhered together, but differing in composition. Multiple-layer films may also be formed by extrusion coating whereby a substrate material is contacted with the hot molten polymer as the polymer exits the die. For instance, an already formed film may be extrusion coated with a layer of the blend compositions described herein as the latter is extruded through the die. Multiple-layer films may also be formed by combining two or more single layer films prepared as described above. The total thickness of multilayer films may vary based upon the application desired. Those of skill in the art will appreciate that the thickness of individual layers for multilayer films may be adjusted based on desired end use performance, polymer compositions employed, equipment capability, and other like factors.

The total thickness of the film may vary based upon the application desired. In some embodiments the total unstretched film thickness is about 1.0-100.0 μm. Typically, elastic films have a thickness of about 5-50 μm in most applications.

Thus, provided herein are films comprising a blend composition, where the blend composition comprises a PAO and a propylene-based elastomer as described herein. The film may have improved soft-stretch as compared to films comprising similar propylene-based elastomers but that do not contain the PAO and as compared to films comprising similar propylene-based elastomers and lower viscosity PAOs.

Films made with the blend compositions described herein may also crystallize at higher temperatures. This can allow for in-line crystallization during the fabrication process, which allows the film properties to stay more consistent over time.

Fibers and Nonwoven Compositions

The compositions described herein may be useful in meltspun (e.g., meltblown or spunbond) fibers and nonwoven compositions (e.g., fabrics). As used herein, "meltspun nonwoven composition" refers to a composition having at least one meltspun layer, and does not require that the entire composition be meltspun or nonwoven. As used herein, "nonwoven" refers to a textile material that has been produced by methods other than weaving. In nonwoven fabrics, the fibers are processed directly into a planar sheet-like fabric structure and then are either bonded chemically, thermally, or interlocked mechanically (or both) to achieve a cohesive fabric.

Nonwoven compositions comprising the blend of the PAO and PBE may be described as extensible. "Extensible," as used herein, means any fiber or nonwoven composition that yields or deforms (i.e., stretches) upon application of a force. While many extensible materials are also elastic, the term extensible also encompasses those materials that remain extended or deformed upon removal of the force. When an extensible facing layer is used in combination with an elastic core layer, the extensible layer may permanently deform when the elastic layer to which it is attached stretches and retracts, creating a wrinkled or textured outer surface which gives an additional soft feel that is particularly suited for articles in which the facing layer is in contact with a wearer's skin.

The fibers and nonwoven compositions can be formed by any method known in the art. For example, the nonwoven compositions may be produced by a spunmelt process. In certain embodiments herein, the layer or layers of the nonwoven compositions of the invention are produced by a spunbond process. When the compositions further comprise one or more elastic layers, the elastic layers may be produced by a meltblown process, by a spunbond or spunlace process, or by any other suitable nonwoven process.

Fibers produced from the blend compositions may have a thickness from about 0.5 to about 10 denier, or from about 0.75 to about 8 denier, or from about 1 to about 6 denier, or from about 1 to about 3 denier. Although commonly referred to in the art and used herein for convenience as an indicator of thickness, denier is more accurately described as the linear mass density of a fiber. A denier is the mass (in grams) of a fiber per 9,000 meters. In practice, measuring 9,000 meters may be both time-consuming and wasteful. Usually, a sample of lesser length (i.e., 900 meters, 90 meters, or any other suitable length) is weighed and the result multiplied by the appropriate factor to obtain the denier of the fiber.

The fiber denier (g/9000 m) of a polypropylene-based fiber can be converted to diameter in microns using the following formula:

$$D = 2\sqrt{\frac{\text{denier}}{(0.006432)}}$$

Thus, a 1.0 denier polypropylene fiber would have a diameter of about 12.5 micron and a 2.0 denier polypropylene fiber would have a diameter of 17.6 micron.

The fibers may be monocomponent fibers or bicomponent fibers. Preferably, the fibers are monocomponent fibers, meaning that the fibers have a consistent composition throughout their cross-section.

The layer that comprises the blend may have a basis weight of less than 50 g/m² ("gsm"), or less than 40 gsm, or less than 30 gsm, or less than 25 gsm, or less than 20 gsm. The layer that comprises the blend may have a basis weight of from about 1 to about 75 g/m² ("gsm"), or from about 2 to about 50 gsm, or from about 5 to about 35 gsm, or from about 7 to about 25 gsm, or from about 10 to about 25 gsm.

In addition to good extensibility and elongation, fibers comprising the blends described herein may also be used to produce fabrics that have improved aesthetics. For example, the fabrics may have an improved feel and softness. Without being bound by theory, it is believed that fabrics produced using the blends described herein have lower bending modulus, due to lower crystallinity, which improves the softness or feel of the fabric. Fabrics made from fibers comprising the blends described herein may have improved softness, as measured by a Handle-O-Meter.

As used herein, "meltblown fibers" and "meltblown compositions" (or "meltblown fabrics") refer to fibers formed by extruding a molten thermoplastic material at a certain processing temperature through a plurality of fine, usually circular, die capillaries as molten threads or filaments into high velocity, usually hot, gas streams which attenuate the filaments of molten thermoplastic material to reduce their diameter, which may be to microfiber diameter. Thereafter, the meltblown fibers are carried by the high velocity gas stream and are deposited on a collecting surface to form a web or nonwoven fabric of randomly dispersed meltblown fibers. Such a process is generally described in, for example, U.S. Pat. Nos. 3,849,241 and 6,268,203. The term meltblowing as used herein is meant to encompass the meltspray process.

In a typical spunbond process, polymer is supplied to a heated extruder to melt and homogenize the polymers. The extruder supplies melted polymer to a spinneret where the polymer is fiberized as passed through fine openings arranged in one or more rows in the spinneret, forming a curtain of filaments. The filaments are usually quenched with air at a low temperature, drawn, usually pneumatically, and deposited on a moving mat, belt or "forming wire" to form the nonwoven composition. See, for example, in U.S. Pat. Nos. 4,340,563; 3,692,618; 3,802,817; 3,338,992; 3,341,394; 3,502,763; and 3,542,615. The term spunbond as used herein is meant to include spunlace processes, in which the filaments are entangled to form a web using high-speed jets of water (known as "hydroentanglement").

Elastic Laminates

The blend compositions described herein may be particularly useful in forming a film layer that is part of an elastic laminate. The elastic laminate may comprise at least one film layer containing the blend composition and at least one nonwoven facing layer. For example, in some embodiments the elastic laminate comprises an inner elastic film layer and two outer nonwoven facing layers. The outer nonwoven facing layers may be made from any polymer that is suitable for forming nonwoven facing layers, and for example may be made from polypropylene, propylene-ethylene copolymers, propylene-based elastomers, polyethylene, polyethylene-terephthalate blends (PET), and blends thereof.

A typical laminate or composite has three or more layers, with the elastic film layer(s) ("F") sandwiched between two or more outer fabric layers that may be spunbonded layers ("S"), meltblown layers ("M"), or spunlace layers ("L"). Examples of laminate combinations include, but are not limited to SFS, MFS, LFL, SFM, SFL, MFL, SSMFMSS, SMFMS, and SMMSS composites. Composites can also be made of the meltblown or spunbond nonwovens of the invention with other materials, either synthetic or natural, to produce useful articles.

The nonwoven laminate composition may comprise one or more elastic film layers comprising a PBE and further comprise one or more nonwoven facing layers as described herein positioned on one or both sides of the elastic layer(s). In some embodiments, the film is made in a first process and then the roll of film is laminated to nonwoven facing layers, for example, by pressing the layers through a nip and using heat and pressure to bond the nonwoven layers to the film layers, or by ultrasonic bonding, or by using a hot melt adhesive. In some embodiments, the nonwoven laminate is made in an extrusion lamination process where the film layer is extruded onto a pre-existing nonwoven fabric layer. In some embodiments, the nonwoven laminate is made by forming the nonwoven layer directly onto the film layer.

The nonwoven products described above may be used in many articles such as hygiene products including, but not limited to, diapers, feminine care products, and adult incontinent products. The nonwoven products may also be used in medical products such as sterile wrap, isolation gowns, operating room gowns, surgical gowns, surgical drapes, first aid dressings, and other disposable items. In particular the nonwoven products may be useful as facing layers for medical gowns, and allow for extensibility in the elbow area of the gown. The nonwoven products may also be useful in disposable protective clothing, and may add toughness to elbow and knee regions of such clothing. The nonwoven products may also be useful as protective wrapping, packaging or wound care. The nonwoven products may also be useful in geotextile applications, as the fabric may have improved puncture resistance in that the fabric will deform instead of puncture.

EXAMPLES

In order to provide a better understanding of the foregoing discussion, the following non-limiting examples are offered. Although the examples may be directed to specific embodiments, they are not to be viewed as limiting the invention in any specific respect. All parts, proportions, and percentages are by weight unless otherwise indicated.

The propylene-based elastomer (PBE) used in the Examples was a metallocene-catalyzed reactor blended PBE. The PBE was a dual reactor polymer having a first reactor component (R1) and a second reactor component (R2) made in parallel solution polymerization reactors, with the reaction effluent from each reactor being blended together to give the final reactor blended PBE. The minor fraction (5-15 wt %) of the PBE had a higher crystallinity and lower ethylene content relative to the major fraction, with the major fraction having a higher ethylene content and imparting elastic properties to the PBE. The PBE used in the Examples contained 500-1500 ppm Irganox™ 1076 antioxidant and had the properties described in Table 1.

TABLE 1

| PBE Properties | | | |
|---|---|---|---|
| PBE | Overall C2, wt % | MFR ($I_2$ at 230° C.) (g/10 min) | Density (g/cc) |
| PBE-1 | 16.6 | 3.0 | 0.861 |

The PAO used in the Examples had the properties described in Table 2. The specific gravity (SG) can be measured at 15.6° C. (1 atm) using ASTM D4052. The kinematic viscosity (KV) can be measured at both 40° C. and 100° C. using ASTM D445. The viscosity index (VI) can be measured using ASTM D2270. The pour point can be measured using ASTM D5959/D97. The flash point (COC) can be measured using ASTM D92.

TABLE 2

| PAO | SG @ 15.6° C. | KV @ 100° C. | KV @ 40° C. | VI | Pour Point, ° C. | Flash Point (COC)° C. | Mw |
|---|---|---|---|---|---|---|---|
| PAO-10 | 0.835 | 10.0 cSt | 66 cSt | 137 | −48° C. | 266° C. | <1000 g/mole |

PAO Properties

The PAO-10 was blended with the PBE-1 resin to form masterbatch compositions. The formulations for the masterbatch compositions are listed in Table 3. The masterbatch compositions were prepared in a twin screw extruder, using PBE-1 as the base resin. The PAO was added downstream of the extruder feed throat. MB-1 and MB-2 were compounded using an aggressive mixing screw, while MB-3 and MB-4 were compounded with a low shear screw. After the blend composition was pelletized, about 0.5 wt % low density polyethylene (LDPE) was added as a dusting additive to the pelletized MB-1 and MB-2. The melt flow rate (MFR) of the samples was measured according to ASTM D1236 at 230° C. using a 2.16 kg weight.

TABLE 3

Masterbatch Formulations

| | PAO Content | Masterbatch MFR (g/10 min) | PE Dust | Compounding Screw Type |
|---|---|---|---|---|
| MB-1 | 20 wt % | 26.3 | Yes | Aggressive |
| MB-2 | 20 wt % | 26.3 | Yes | Aggressive |
| MB-3 | 20 wt % | 9.7 | No | Low Shear |
| MB-4 | 7 wt % | 4.5 | No | Low Shear |

Example 1

Blend formulations were prepared in a laboratory PRISM twin screw extruder using the ingredients listed in Table 4. A 300 gram batch size was used for each formulation. The ingredients were tumble blended and introduced directly into the extruder hopper. The compounds were extruded using a melt temperature of 180° C. and an extruder rate ranging from 70 to 100 rpm. The feed rate and the extruder rpm were adjusted to maintain a steady throughput without exceeding the torque limits of the extruder. The formulations were manually separated into smaller pieces and compression molded into test specimen.

Isothermal crystallization studies using differential scanning calorimetry (DSC) method were conducted by heating the polymer samples to 200° C., holding the sample for five (5) minutes at 200° C., and then cooling down the sample to various temperatures ranging from 40° C. to 70° C., as described below, and allowing the polymer to crystallize at the specified temperature. The half-time (minutes) was recorded as the time required to develop one-half (½) of the total crystallinity at a given temperature.

To measure the isothermal crystallization at 40 and 50° C. by DSC the sample is (1) heated to 200° C. and held at that temperature for 5 minutes; (2) cooled from 200° C. to 70° C. at 150° C./min; (3) cooled from 70° C. to 50° C. at 40° C./min; (4) held for 45 minutes at 50° C. (where crystallization half-time is measured); (5) heated from 50° C. to 200° C. at 150° C./min; (6) held at 200° C. for 5 minutes; (7) cooled from 200° C. to 60° C. at 150° C./min; (8) cooled from 60° C. to 40° C. at 40° C./min; and (9) held for 45 minutes at 40° C. (where the crystallization half-time is measured.

To measure the isothermal crystallization at 60 and 70° C. by DSC the sample is (1) heated to 200° C. and held at that temperature for 5 minutes; (2) cooled from 200° C. to 90° C. at 150°/min; (3) cooled from 90° C. to 70° C. at 40° C./min; (4) held at 70° C. for 45 minutes (where the crystallization half-time is measured); (5) heated from 70° C. to 200° C. at 150°/min; (6) held at 200° C. for 5 minutes; (7) cooled from 200° C. to 80° C. at 150° C./min; (8) cooled from 80° C. to 60° C. at 40°/min; (9) held at 60° C. for 45 minutes (where the crystallization half-time is measured); (10) heated from 60° C. to 200° C. at 40° C./min; and (11) held for 2 minutes at 200° C.

The hysteresis response of each specimen was measured in tension using a grip separation of 25.4 mm and a cross-head speed of 508 mm/min. The test sample was extended to 100% and then returned to zero load without any hold. The retractive force measured as load at 50% extension on return and the permanent set were measured.

TABLE 4

Blend Formulations

| Example Blend Formulations | | 1 | 2 | 3 | 4 | 5 | 6 | 7 | 8 | 9 |
|---|---|---|---|---|---|---|---|---|---|---|
| MB-1 | wt % | | 75 | 50 | 25 | | | | | |
| MB-2 | wt % | | | | | 75.0 | 50.0 | 25.0 | | |
| MB-3 | wt % | | | | | | | | 75.0 | 50.0 |
| PBE-1 | wt % | | 25.0 | 50.0 | 75.0 | 25.0 | 50.0 | 75.0 | 25.0 | 50.0 |
| MB-4 | wt % | 100.0 | | | | | | | | |
| Total | wt % | 100.0 | 100.0 | 100.0 | 100.0 | 100.0 | 100.0 | 100.0 | 100.0 | 100.0 |
| Effective PAO in Blend Formulation | wt % | 7.0 | 15.0 | 10.0 | 5.0 | 15.0 | 10.0 | 5.0 | 15.0 | 10.0 |
| Blend MFR | g/10 min | 4.2 | 10.8 | 5.6 | 3.8 | 18.2 | 8.4 | 4.5 | 7.4 | 4.2 |
| DSC Isothermal Crystallization | | | | | | | | | | |
| 40° C. | min | 4.1 | No Data | No Data | No Data | No Data | No Data | No Data | 1.4 | 3.1 |
| 50° C. | min | 7.1 | No Data | No Data | No Data | No Data | No Data | No Data | 1.8 | 5.7 |

TABLE 4-continued

| Example Blend Formulations | | 1 | 2 | 3 | 4 | 5 | 6 | 7 | 8 | 9 |
|---|---|---|---|---|---|---|---|---|---|---|
| Blend Formulations | | | | | | | | | | |
| 60° C. | min | DNC | No Data | 1.9 | 3.2 | No Data | 1.0 | 1.7 | 5.6 | 11.1 |
| 70° C. | min | DNC | 7.9 | 9.8 | 12.0 | 4.3 | 5.2 | 7.5 | 11.3 | DNC |
| First Cycle Hysteresis (average of 3 samples) | | | | | | | | | | |
| Top Load at 50% strain | N | 26 | 15 | 20 | 25 | 15 | 19 | 24 | 21 | 26 |
| Top Load at 100% Strain | N | 30 | 18 | 24 | 28 | 18 | 22 | 28 | 25 | 30 |
| Retractive Force @ 50% strain | N | 15 | 7 | 10 | 13 | 7 | 10 | 13 | 11 | 14 |
| Load Loss | % | 42 | 52 | 48 | 46 | 54 | 51 | 48 | 47 | 45 |
| Permanent Set | % | 10.7 | 15.1 | 13.4 | 12.5 | 14.4 | 13.5 | 12.7 | 12.5 | 11.9 |
| Mechanical Hysteresis | % | 40 | 48 | 45 | 44 | 50 | 47 | 45 | 44 | 43 |
| Second Cycle Hysteresis (average of 3 samples) | | | | | | | | | | |
| Top Load at 50% strain | N | 18.9 | 10.6 | 14.3 | 17.8 | 10.0 | 13.2 | 17.2 | 15.3 | 18.9 |
| Top Load at 100% Strain | N | 28.6 | 16.9 | 22.4 | 26.5 | 16.4 | 21.1 | 26.3 | 23.3 | 28.0 |
| Retractive Force @ 50% strain | N | 14.4 | 7 | 10.0 | 12.6 | 6.5 | 9.1 | 12.0 | 10.8 | 13.5 |
| Load Loss | % | 23.8 | 33.95 | 30.3 | 29.6 | 34.6 | 31.3 | 29.9 | 29.0 | 28.6 |
| Permanent Set | % | 5.2 | 9.14 | 7.7 | 6.9 | 9.0 | 7.9 | 7.2 | 6.8 | 6.5 |
| Mechanical Hysteresis | % | 21.8 | 29.75 | 27.0 | 26.6 | 30.5 | 27.9 | 26.8 | 26.0 | 25.7 |

DNC = Did not crystallize.
No Data = Crystallization half-time was too short to be recorded.

FIG. 1 illustrates the change in the crystallization half-time at different PAO concentrations for the formulations in Table 4 at 70° C. Example Blend 1 did not crystallize at 70° C. Likewise, Example Blend 9 also did not crystallize at 70° C. However, Example Blends 2 through 7 which utilized the MB-1 and MB-2 which contained the LDPE dust did crystallize at 70° C. While Example Blend 8 did crystallize at 70° C., it did so at a crystallization half-time that was increased as compared to the formulations with equivalent PAO concentrations that utilized MB-1 and MB-2 (Example Blends 2 and 5).

FIG. 2 illustrates the change in the crystallization half-time at different PAO concentrations for the formulations in Table 4 at 60° C. Example Blend 1 did not crystallize at 60° C. While Example Blend 9 (utilizing MB-3) did crystallize at 60° C., the crystallization half-time was longer than that of Example Blends 3 and 6 (utilizing MB-1 and MB-2) that had the same effective PAO concentration. For Example Blends 2 and 5, there was crystallization at 60° C., however the crystallization half-times could not be measured due to the short time duration. Thus, at equivalent PAO concentration, the formulations utilizing MB-1 and MB-2 that contained the LDPE dust exhibited shorter crystallization half-times as compared to the formulations that did not utilize LDPE dust.

FIGS. 3 and 4 illustrate the change in load at 100% elongation at relative to Example Blend 1 for formulations containing an effective amount of PAO of 15 wt % and 10 wt %, respectively. A higher change in the top load represents enhanced soft stretch of the composition as compared to Example Blend 1. Thus, as seen in FIGS. 3 and 4, the compounds containing MB-1 and MB-2 exhibited a higher change (or lower overall top load) as compared to the formulations containing MB-3 (Example Blends 8 and 9).

Example 2

Table 5 illustrates the use of a β-nucleator in formulations containing PBE-1. The β-nucleator used in Example 2 was NJSTAR NU-100 which is available from New Japan Chemical Co., Ltd. NJSTAR NU-100 has a melting point of about 380-390° C., and is N,N'-dicyclohexyl-2,6-naphthalene dicarboxamide and has the below structural formula:

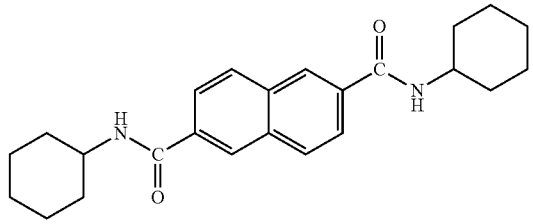 [SMILES: O=C(NC1CCCCC1)c1ccc2cc(C(=O)NC3CCCCC3)ccc2c1]

The formulations in Table 5 were prepared in a laboratory PRISM twin-screw extruder using a batch size of 300 grams. The melt flow rate, DSC isothermal crystallization half-times, and hysteresis tests were performed as described above. As seen in Table 5, the formulation containing MB-4 alone did not crystallize at the elevated temperatures 60° C. and 70° C. In comparison, Example Blend 11 exhibited crystallization at a broad range of temperatures from 40° C. to 70° C., with reduced half times as compared to Example Blend 10. The hysteresis testing shows that the load at 50% strain and 100% strain of Example Blend 11 remained relatively unchanged as compared to Example Blend 10. As such, the addition of the β-nucleator in Example Blend 11 did not diminish the soft-stretch attributes of Example Blend 10.

TABLE 5

| Example Blend Formulations | | 10 | 11 |
|---|---|---|---|
| MB-4 | wt % | 100.0 | 99.0 |
| NJSTAR NU-100 | wt % | — | 1.0 |
| Total | wt % | 100.0 | 100.0 |
| MFR | g/10 min | 4.3 | 3.9 |
| DSC Isothermal Crystallization | | | |
| 40° C. | min | 4.3 | 1.6 |
| 50° C. | min | 7.2 | 2.4 |
| 60° C. | min | DNC | 2.8 |
| 70° C. | min | DNC | 3.9 |

TABLE 5-continued

|  | | 10 | 11 |
|---|---|---|---|
| First Cycle Hysteresis (average of 3 samples) | | | |
| Top Load at 50% strain | N | | 24 | 25 |
| Top Load at 100% Strain | N | | 28 | 28 |
| Retractive Force @ 50% strain | N | | 14 | 12 |
| Load Loss | % | | 43 | 50 |
| Permanent Set | % | | 11.1 | 3.2 |
| Mechanical Hysteresis | % | | 41 | 47 |

Example 3

A comparison of the crystallization half-times of samples made utilizing the masterbatches that contained the LDPE dust and the samples containing nucleators was made. Blend A is 93 wt % PBE-1 and 7 wt % PAO-10. Blend B is 89 wt % PBE-1 and 11 wt % PAO-10. Blend C is 85 wt % PBE-1 and 15 wt % PAO-10. The data is shown in Table 6.

VM6102 was Vistamaxx™ 6102 propylene-based elastomer available from ExxonMobil Chemical Company. VM6102 is a propylene-ethylene copolymer containing 16 wt % ethylene-derived units and has the following typical properties: a density of 0.862 g/cc (ASTM D1505), a melt index (190° C.; 2.16 kg) of 1.4 g/10 min (ASTM D1238), a melt mass-flow rate (MFR) (230° C.; 2.16 kg) of 3 g/10 min (ASTM D1238), a Shore A durometer hardness of 66 (ASTM D224), and a Vicat softening temperature of 52.2° C.

TABLE 6

Crystallization Half-Times (min)

| | | | | Ex. | | | | | |
|---|---|---|---|---|---|---|---|---|---|
| Temp. (° C.) | 12 VM6102 | 13 Blend A | 14 Blend A + 1 wt % NU100 | 15 Blend B + LDPE Dust | 16 Blend B | 17 Blend C + LDPE Dust | 18 Blend C | 19 Blend B + 0.5 wt % NU100 | 20 Blend C + 0.5 wt % NU100 |
| 25 | — | — | — | 1.731 | 2.155 | 1.686 | 2.069 | — | — |
| 35 | 4.65 | — | — | 1.779 | 2.427 | 1.785 | 2.462 | — | — |
| 40 | — | 4.317 | 1.58 | — | — | 1.75 | — | 2.167 | 2.15 |
| 45 | 11.817 | 5.633 | — | 2.182 | 3.62 | 2.278 | 3.722 | — | — |
| 50 | — | 7.2 | 2.35 | — | — | 2.417 | — | 2.85 | 2.5 |
| 55 | 16.5 | — | — | 4.241 | 7.967 | 4.474 | 8.424 | — | — |
| 60 | DNC | — | 2.817 | — | — | 3.85 | — | 3.517 | 3.267 |
| 70 | DNC | DNC | 3.85 | DNC | DNC | DNC | DNC | 5.6 | 4.617 |

"—" = No sample was tested.
DNC = The sample was tested, but no crystallization was observed.

As seen in Table 6 and FIG. 5, the samples containing the NU100 exhibited crystallization at 70° C., while the other samples did not.

Example 4

A comparison of the melting temperature and heat of fusion data for some of the sample formulations from Example 3 is shown in Table 7. There is an additional example that uses the HPN 600 nucleator, which is Hyperform HPN600E1 from Milliken which is an alpha-nucleator that is a zinc salt of octadecanoic acid.

The non-isothermal DSC properties in Table 7 were measured as follows: (1) the sample is cooled to −40° C.; (2) the sample is held at −40° C. for 10 minutes; (3) the sample is heated from −40° C. to 200° C. at 10°/min; (4) the sample is held at 200° C. for 10 minutes; (5) the sample is cooled from 200° C. to −40° C. at 10° C./min; (6) the sample is held at −40° C. for 10 minutes; and (7) the sample is heated from −40° C. to 200° C. at 10° C./min.

TABLE 7

| | First Heat | | | Cooling | | | Second Heat | | |
|---|---|---|---|---|---|---|---|---|---|
| | T1 (° C.) | T2 (° C.) | Total ΔH (J/g) | T1 (° C.) | T2 (° C.) | Total ΔH (J/g) | Cold Crystal (° C.) | T2 (° C.) | Total ΔH (J/g) |
| Ex. 13 - Blend A | 60 | 106 | 12.4 | None | None | None | 3 | 105 | 3.6 |
| Ex. 16 - Blend B | 54 | 106 | 7.3 | 17 | None | 3.1 | None | 105 | 2.4 |
| Ex. 18 - Blend C | 49 | 106 | 6.8 | 19 | None | 3.7 | None | 105 | 2.8 |

TABLE 7-continued

| | First Heat | | | Cooling | | | Second Heat | | |
|---|---|---|---|---|---|---|---|---|---|
| | T1 (° C.) | T2 (° C.) | Total ΔH (J/g) | T1 (° C.) | T2 (° C.) | Total ΔH (J/g) | Cold Crystal (° C.) | T2 (° C.) | Total ΔH (J/g) |
| Ex. 15 - Blend B + dust | 52 | 105 | 9.1 | 22 | None | 4.1 | None | 105 | 3.1 |
| Ex. 17 - Blend C + dust | 51 | 106 | 7.8 | 29 | None | 5.2 | None | 106 | 3.0 |
| Ex. 14 - Blend A + 1% NU100 | 48 | 109 | 11.3 | 32 | None | 3.1 | None | 106 | 3.8 |
| Ex. 21 Blend A + 1% HPN600 | 48 | 103 | 12.0 | 83 | None | 1.6 | None | 107 | 4.1 |
| PBE-1 | 56 | 107 | 9.0 | 25 | None | 0.7 | 11 | 106 | 2.9 |

Example 5

Blend formulations were prepared in a laboratory PRISM twin screw extruder using the ingredients listed in Table 8 using the procedure described in Example 1. The hysteresis response, non-isothermal crystallization, and isothermal crystallization properties of the blends were measured. In Example 5, Blend B is a pre-compounded blend of 89 wt % PBE-1 and 11 wt % PAO-10, and Blend C is a pre-compounded blend of 85 wt % PBE-1 and 15 wt % PAO-10.

TABLE 8

| | | 22 | 23 | 24 |
|---|---|---|---|---|
| Example Blend Formulations | | | | |
| Blend B | wt % | 99.5 | — | 100 |
| Blend C | wt % | — | 99.5 | — |
| NU100 | wt % | 0.5 | 0.5 | — |
| DSC Isothermal Crystallization | | | | |
| 40° C. | min | 2.23 | 2.19 | 1.78 |
| 50° C. | min | 2.89 | 2.55 | 2.35 |
| 60° C. | min | 3.75 | 3.17 | 4.14 |
| 70° C. | min | 5.49 | 5.28 | DNC |
| First Cycle Hysteresis (average of 3 samples) | | | | |
| Top Load at 50% strain | N | 19 | 15 | 14 |
| Top Load at 100% Strain | N | 23 | 18 | 16 |
| Retractive Force @ 50% strain | N | 10 | 7 | 6 |
| Load Loss | % | 49 | 54 | 56 |
| Permanent Set | % | 14 | 16 | 17 |
| Mechanical Hysteresis | % | 47 | 52 | 54 |
| Second Cycle Hysteresis (average of 3 samples) | | | | |
| Top Load at 50% strain | N | 13 | 10 | 9 |
| Top Load at 100% Strain | N | 21 | 16 | 15 |
| Retractive Force @ 50% strain | N | 9 | 6 | 6 |
| Load Loss | % | 30 | 33 | 35 |
| Permanent Set | % | 8 | 11 | 11 |
| Mechanical Hysteresis | % | 28 | 32 | 34 |
| Non Isothermal Crystallization First Melt | | | | |
| Total Delta H | J/g | nm | 10.2 | 11.4 |
| Peak 1 | ° C. | nm | 57.4 | 56.6 |
| Peak 2 | ° C. | nm | 104.4 | 105.4 |
| Cooling | | | | |
| Total Delta H | J/g | nm | 9.7 | 11.8 |
| Peak 1 | ° C. | nm | 101.6 | 96.2 |
| Peak 2 | ° C. | nm | 50.3 | 32.2 |
| Delta Hc/Delta H first melt | — | — | 0.95 | 1.04 |
| Second Melt | | | | |
| Total Delta H | J/g | nm | 9.7 | 10.2 |
| Peak 1 | ° C. | nm | 51.6 | 52.2 |
| Peak 2 | ° C. | nm | 103.9 | 105.1 |

DNC = The sample was tested, but no crystallization was observed.
nm = Not measured.

Certain embodiments and features have been described using a set of numerical upper limits and a set of numerical lower limits. Ranges from any lower limit to any upper limit are contemplated unless otherwise indicated. All numerical values are "about" or "approximately" the indicated value, and take into account experimental error and variations that would be expected by persons of ordinary skill in the art.

As used herein, the phrases "substantially no," and "substantially free of" are intended to mean that the subject item is not intentionally used or added in any amount, but may be present in very small amounts existing as impurities resulting from environmental or process conditions.

All patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

We claim:

1. A composition comprising from about 0.5 to about 60 wt % of a polyalphaolefin and 40 to 99.5 wt % of a propylene-based elastomer, based on the weight of the composition, and a β-nucleating agent,
    wherein the propylene-based elastomer comprises propylene-derived units and 5 to 30 wt % of α-olefin-derived units and where the propylene-based elastomer has a melting temperature of less than 120° C. and a heat of fusion of less than 75 J/g;
    wherein the polyalphaolefin has a kinematic viscosity (KV) at 100° C. of from 3 to 3000 cSt;
    wherein the β-nucleating agent is selected from:
    (i) amide compounds of formula (1):

$$R^2—NHCO—R^1—CONH—R^3 \qquad (1)$$

wherein $R^1$ is a residue of a $C_{3-20}$ saturated or unsaturated aliphatic dicarboxylic acid, a residue of a $C_{6-30}$ saturated or unsaturated alicyclic dicarboxylic acid or a residue of a $C_{8-30}$ aromatic dicarboxylic acid; $R^2$ and $R^3$ are the same or different and each represents a $C_{3-12}$ cycloalkyl group, a $C_{3-12}$ cycloalkenyl group, or a group of the formula

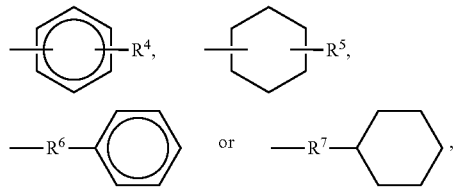

wherein $R^4$ is a hydrogen atom, a $C_{1-12}$ straight- or branched-chain alkyl group, a $C_{2-12}$ straight- or branched chain alkenyl group, a $C_{6-10}$ cycloalkyl group or a phenyl group; $R^5$ is a $C_{1-12}$ straight- or branched-chain alkyl group, a $C_{2-12}$ straight- or branched-chain alkenyl group, a $C_{6-10}$ cycloalkyl group or a phenyl group; and $R^6$ and $R^7$ each represents a $C_{1-4}$, straight- or branched-chain alkylene group; with the proviso that when $R^4$ is a hydrogen atom, a $C_{1-12}$ alkyl group or a $C_{6-10}$ cycloalkyl group, $R^1$ is a residue of a $C_6$ or $C_8$ saturated aliphatic dicarboxylic acid (ii) amide compounds of formula (2):

wherein $R^8$ is a residue of a $C_{4-28}$ alicyclic diamine, a residue of a $C_{4-14}$ heterocyclic diamine or a residue of a $C_{6-28}$ aromatic diamine; $R^9$ and $R^{10}$ are the same or different and each represents a $C_{3-12}$ cycloalkyl group, a $C_{3-12}$ cycloalkenyl group, or a group of the formula

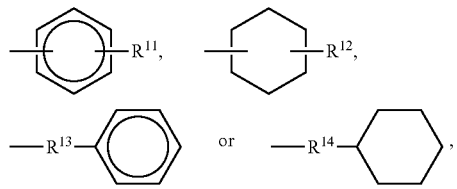

wherein $R^{11}$ is a hydrogen atom, a $C_{1-12}$ straight- or branched-chain alkyl group, a $C_{2-12}$ straight- or branched chain alkenyl group, a $C_{6-10}$ cycloalkyl group or a phenyl group; $R^{12}$ is a $C_{1-12}$ straight- or branched-chain alkyl group, a $C_{2-12}$ alkenyl group, a $C_{6-10}$ cycloalkyl group or a phenyl group; and $R^{13}$ and $R^{14}$ each represents a $C_{1-4}$ straight- or branched-chain alkylene group; with the proviso that $R^8$ is not

or (iii) amide compounds of formula (3):

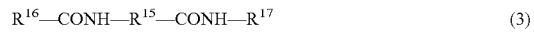

wherein $R^{15}$ is a residue of a $C_{2-29}$ saturated or unsaturated aliphatic amino acid, a residue of a $C_{7-13}$ saturated or unsaturated alicyclic amino acid or a residue of a $C_{7-15}$ aromatic amino acid; $R^{16}$ and $R^{17}$ are the same or different and $R^{16}$ has the same meaning as $R^9$ or $R^{10}$ in the formula (2) and $R^{17}$ has the same meaning as $R^2$ or $R^3$ in the formula (1), wherein the composition is pelletized and the pelletized composition is dusted with an ethylene-based polymer.

2. The composition of claim 1, wherein the β-nucleating agent is an amide compound of formula (1) where $R^1$ is —$(CH_2)_4$—,

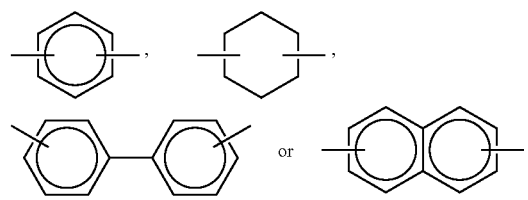

and $R^2$ and $R^3$ are the same or different and each represents a $C_{6-8}$ cycloalkyl group or represents a phenyl group substituted by a $C_{1-4}$, alkyl or cyclohexyl group.

3. The composition of claim 1, wherein the β-nucleating agent is an amide compound of formula (1) where $R^1$ is

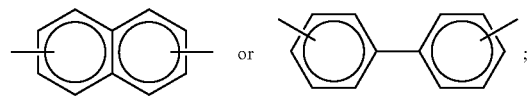

and $R^2$ and $R^3$ may be the same or different and each means a $C_{5-12}$ cycloalkyl group.

4. The composition of claim 1, wherein the β-nucleating agent is an amide compound of formula (1) selected from N,N'-dicyclohexylterephthalamide, N,N'-dicyclohexyl-2,6-naphthalenedicarboxamide, N,N'-dicyclooctyl-2,6-naphthalenedicarboxamide, N,N'-dicyclohexyl-1,4-cyclohexanedicarboxamide, N,N'-dicyclohexyl-4,4'-biphenyldicarboxamide, N,N'-bis(p-methylphenyl)hexanediamide, N,N'-bis(p-ethylphenyl)hexanediamide, N,N'-bis(4-cyclohexylphenyl)hexanediamide, N,N'-diphenylhexanediamide, and N,N'-diphenyloctanediamide.

5. The composition of claim 1, wherein the composition exhibits an onset of crystallization at a temperature of at least 60° C.

6. A composition comprising from about 0.5 to about 60 wt % of a polyalphaolefin and 40 to 99.5 wt % of a propylene-based elastomer, based on the weight of the composition, wherein the propylene-based elastomer comprises propylene-derived units and 5 to 30 wt % of α-olefin-derived units and where the propylene-based elastomer has a melting temperature of less than 120° C. and a heat of fusion of less than 75 J/g;

wherein the polyalphaolefin has a kinematic viscosity (KV) at 100° C. of from 3 to 3000 cSt;

wherein the composition is pelletized and the pelletized composition is dusted with a low density polyethylene; and wherein the dusted composition exhibits an onset of crystallization at a temperature of at least 60° C.

7. The composition of claim 6, wherein the composition further comprises a β-nucleating agent selected from N,N'-dicyclohexyl-2,6-naphthalenedicarboxamide and N,N'-dicyclooctyl-2,6-naphthalenedicarboxamide.

8. The composition of claim 1, where the propylene-based polymer elastomer is a reactor blend of a first polymer component and a second polymer component, wherein the first polymer component comprises propylene and an α-olefin and has an α-olefin content $R_1$ of from greater than 5 to less than 30 wt % α-olefin, where the percentage by weight is based upon the total weight of the propylene-derived and α-olefin derived units of the first polymer component, and wherein the second polymer component comprises propylene and α-olefin and has an α-olefin content $R_2$ of from greater than 1 to less than 10 wt % α-olefin, where the percentage by weight is based upon the total weight of the propylene-derived and α-olefin derived units of the second polymer component.

9. The composition of claim 8, where the first polymer component has an α-olefin content $R_1$ of from 10 to 25 wt % α-olefin, based on the weight of the first polymer component.

10. The composition of claim 8, where the second polymer component has an α-olefin content $R_2$ of from greater than 2 to less than 8 wt % α-olefin, based on the weight of the first polymer component.

11. The composition of claim 8, where the propylene-based elastomer comprises from 1 to 25 wt % of the second polymer component and from 75 to 99 wt % of the first polymer component, based on the weight of the propylene-based elastomer.

12. The composition of claim 1, where the polyalphaolefin comprises oligomers of α-olefins having from 5 to 24 carbon atoms.

13. The composition of claim 1, where the polyalphaolefin comprises oligomers of 1-octene, 1-decene, 1-dodecene, and blends thereof.

14. The composition of claim 1, wherein the polyalphaolefin has a kinematic viscosity (KV) at 100° C. of from 5 to 100 cSt.

15. The composition of claim 1, wherein the composition has a crystallization half-life of less than 10 minutes at 70° C. temperature.

16. A film or nonwoven fabric comprising the composition claim 1.

17. A laminate composition having at least one elastic film layer, wherein the elastic film layer comprises the composition of claim 1.

18. The laminate composition of claim 17, wherein the laminate composition further comprises one or more nonwoven facing layers disposed on either side of the elastic film layer.

19. The composition of claim 6, where the propylene-based polymer elastomer is a reactor blend of a first polymer component and a second polymer component, wherein the first polymer component comprises propylene and an α-olefin and has an α-olefin content R1 of from greater than 5 to less than 30 wt % α-olefin, where the percentage by weight is based upon the total weight of the propylene-derived and α-olefin derived units of the first polymer component, and wherein the second polymer component comprises propylene and α-olefin and has an α-olefin content R2 of from greater than 1 to less than 10 wt % α-olefin, where the percentage by weight is based upon the total weight of the propylene-derived and α-olefin derived units of the second polymer component.

* * * * *